(12) United States Patent
Makurunje et al.

(10) Patent No.: US 10,040,724 B2
(45) Date of Patent: Aug. 7, 2018

(54) CERAMIC COMPOSITE AND METHOD TO PREPARE THE COMPOSITE

(71) Applicants: University of the Witwatersrand, Johannesburg, Johannesburg (ZA); Fraunhofer-Gesellschaft zur Forderung der Angewandten Forschung E.V., München (DE)

(72) Inventors: Phylis Sarah Makurunje, Braamfontein (ZA); Iakovos Sigalas, Randburg (ZA); Mathias Herrmann, Coswig (DE)

(73) Assignees: University of the Witwatersrand, Johannesburg, Johannesburg (ZA); Fraunhofer-Gesellschaft zur Forderung der Angewandten Forschung E.V., München (DE)

( * ) Notice: Subject to any disclaimer, the term of this patent is extended or adjusted under 35 U.S.C. 154(b) by 0 days.

(21) Appl. No.: 15/374,658

(22) Filed: Dec. 9, 2016

(65) Prior Publication Data

US 2017/0166486 A1    Jun. 15, 2017

(30) Foreign Application Priority Data

Dec. 11, 2015 (ZA) .................... 2015/09065

(51) Int. Cl.
    *C04B 35/83* (2006.01)
    *C04B 35/65* (2006.01)
    (Continued)

(52) U.S. Cl.
CPC ............ *C04B 35/83* (2013.01); *C04B 35/573* (2013.01); *C04B 35/65* (2013.01); *C04B 35/806* (2013.01); *C04B 2235/3234* (2013.01); *C04B 2235/3251* (2013.01); *C04B 2235/3255* (2013.01); *C04B 2235/3418* (2013.01); *C04B 2235/36* (2013.01);
(Continued)

(58) Field of Classification Search
CPC . C04B 35/573; C04B 35/65; C04B 2235/616; C03B 2235/616
See application file for complete search history.

(56) References Cited

U.S. PATENT DOCUMENTS

| | | | |
|---|---|---|---|
| 8,741,212 B2 * | 6/2014 | Aghajanian | C04B 35/565 148/538 |
| 2012/0277087 A1 * | 11/2012 | Aghajanian | C22C 29/06 501/88 |

(Continued)

FOREIGN PATENT DOCUMENTS

JP    03290367    * 11/2012

*Primary Examiner* — Karl E Group
(74) *Attorney, Agent, or Firm* — Wolf, Greenfield & Sacks, P.C.

(57) ABSTRACT

The present invention provides for carbide ceramic matrix composite comprising $C_f/C$—SiC-xMC wherein $C_f/C$ is a carbon fiber reinforced carbon matrix, x is at least 2, and wherein MC are carbides of transition metals with M being at least two different transition metals selected from the group consisting of titanium, zirconium, hafnium, vanadium, niobium, tantalum, chromium, molybdenum, and tungsten. The invention further provides for a method for manufacturing the composite.

6 Claims, 16 Drawing Sheets
(14 of 16 Drawing Sheet(s) Filed in Color)

(51) Int. Cl.
*C04B 35/573* (2006.01)
*C04B 35/80* (2006.01)

(52) U.S. Cl.
CPC ............ *C04B 2235/3839* (2013.01); *C04B 2235/3843* (2013.01); *C04B 2235/3891* (2013.01); *C04B 2235/48* (2013.01); *C04B 2235/5436* (2013.01); *C04B 2235/616* (2013.01); *C04B 2235/666* (2013.01); *C04B 2235/80* (2013.01)

(56) References Cited

U.S. PATENT DOCUMENTS

2013/0184141 A1* 7/2013 Ogasawara ............. C04B 41/85
 501/91
2015/0027065 A1* 1/2015 Blomqvist ............. C04B 35/52
 51/307

* cited by examiner

CERAMIC COMPOSITE AND METHOD TO PREPARE THE COMPOSITE

This application claims priority under 35 U.S.C. § 119 (a)-(d) to South African Application No. 2015/09065, filed Dec. 11, 2015, entitled "CERAMIC COMPOSITE AND METHOD TO PREPARE THE COMPOSITE," the contents of which are hereby incorporated by reference in its entirety.

INTRODUCTION

This invention relates to ceramic matrix composites and methods to manufacture these composites, in particular, but not exclusively, to ultra-high temperature carbide ceramic matrix composites comprising $C_f/C$—SiC—XC—YC and their method of manufacture.

BACKGROUND

Ultra-high temperature ceramic composites are particularly useful for application in aggressive environments in which ultra-high temperatures approaching or exceeding 3000° C. and complex ablation dynamics activate mechanical and chemical degradation. Some examples of the use of these thermal protection systems in hypersonic vehicles and re-entry vehicles include the use thereof in leading edges, nosecones, rocket nozzles, and exhaust cones.

Transition metal-carbide ceramics are known for showing the highest melting points of most ceramic materials. Furthermore, hybridised (multi-phased) matrices allow the constituent components to show complementary behaviour in resisting ablative degradation when in service. However, the prevalence of such hybridised matrix composites especially with all-carbides ceramic matrices is still limited.

Carbon fibre reinforced carbon matrix ($C_f/C$) composites succumb to oxidation at temperatures as low as 500° C. when in service, and hence rapidly degrade in effectiveness. The carbon matrix's ablative resistance can be upgraded by introducing transition metals, which can be processed to form carbides, nitrides and borides with high melting points. The usefulness of the substituting transition metal ceramics is ultimately proved in an oxidative environment, whereby the temperature at which the formed oxides melt and volatize determines the degree of protection it imparts to the $C_f/C$ composite.

EP 1 157 979 describes how to impregnate metal silicides into a C/C composite at temperatures around the melting point of the metal silicide, and discloses the infiltration of a metal silicide into a Si—SiC gradient-based or a C/C based composite. Furthermore, in the patent the metal silicide(s) is (are) infiltrated successively. No consequential reaction of the transition metal infiltrants with the carbon matrix is mentioned.

US Patent Publication no. 2004/207133 embodies the formation of a single transition metal carbide matrix. Metal carbide is formed first, with Si then diffused into the formed carbides matrix. A metal oxide coating, particularly like $ZrO_2$, formed around the carbon fibres is proposed, having been introduced by chemical vapour infiltration. Chemical vapour infiltration was performed again to introduce a carbon matrix on top of the coating, serving as the matrix which embeds the coated fibres. Zr was then reaction infiltrated in molten state into the C/C composite at about 1950° C. and molten Si subsequently diffused at about 1500° C. Infiltration of the metal and or silicon was realized by placing pieces thereof above the C/C composite, so as to infiltrate downwards into the latter material. Infiltration was proposed to be done typically at 25-100° C. above the melting point of the metal of the silicon in an induction graphite furnace with long heating and cooling times. The additional infiltration of C before Si infiltration was also proposed. MC and SiC typically occupy 30-60 vol. % in the composite.

International PCT patent application no. PCT/FR2010/051012 is based on vanadium and vanadium alloys and utilises a self-healing protection mechanism for service temperatures up to 900° C. when combined with vitreous oxides, e.g. formed from $B_4C$.

U.S. Pat. No. 5,965,266 presents the use of self-healing SiC based protection directly on the C/C composite. Protection is limited to application temperatures way below the required ultra-high temperature mark of 3000° C.

Ultra-high temperature ceramics are usually intended to operate at temperatures above 2000° C., and preferably above 3000° C. For the most part the prior art has focused on multi-layered interphases and coatings (for example those disclosed in U.S. Pat. No. 6,869,701) in protecting the composite reinforcement skeleton. US Patent Publication no. 2014/0363663 is an example of a composite utilizing both a multi-layered ceramic matrix and fibre coating to reduce oxidation in the composite. The ceramic multi-layers enable the operation of a crack deflection mechanism that provides a tortuous path that delays oxygen transport into the composite.

However, to date no ultra-high temperature ceramic composite has been reported to satisfactorily withstand in-service temperatures of 3000° C., or more, for a satisfactory amount of time.

It is therefore an object of the present invention to provide an improved ultra-high temperature ceramic composite which addresses the shortcomings experienced in the art, including addressing the phenomenon of in-situ matrix cracking.

SUMMARY OF THE INVENTION

According to a first aspect to the present invention there is provided a carbide ceramic matrix composite comprising $C_f/C$—SiC-xMC wherein $C_f/C$ is a carbon fibre reinforced carbon matrix, x is at least 2, and wherein MC are carbides of transition metals, M being at least two different transition metals selected from the group consisting of titanium, zirconium, hafnium, vanadium, niobium, tantalum, chromium, molybdenum, and tungsten.

In one embodiment of the invention x is more than 2, M being more than 2 different transition metals selected from the group consisting of titanium, zirconium, hafnium, vanadium, niobium, tantalum, chromium, molybdenum, and tungsten.

In another embodiment the composite is a ternary carbide ceramic composite with x=2, and M is represented by X and Y, X and Y being different transition metals selected from the group consisting of titanium, zirconium, hafnium, tantalum, molybdenum, and tungsten.

Preferably, X is titanium and Y is tantalum.

Most preferably, the composite is a ternary carbide ceramic composite, and wherein the Si—X—Y alloy is a non-eutectic composition having a ratio of about 17.9 Ti-15.4 Ta-66.7 Si.

In one embodiment of the invention an alloy comprising xM silicides is infiltrated into the carbon fibre reinforced carbon matrix, wherein the alloy is a non-eutectic composition.

Preferably, carbon fibre reinforced carbon matrix has a porosity prior to infiltration of about 15 to about 60% by volume, more preferably about 20 to about 30% by volume.

According to a second aspect to the present invention there is provided a method of producing a carbide ceramic matrix composite comprising $C_f/C$—SiC-xMC, the method comprising the steps of providing a Cf/C composite, providing an Si-xM alloy wherein x is at least 2, and wherein M is at least two different transition metals selected from the group consisting of titanium, zirconium, hafnium, vanadium, niobium, tantalum, chromium, molybdenum, and tungsten, and infiltrating the Si-xM alloy into the $C_f/C$ composite and sintering the composite to produce the $C_f/C$—SiC-xMC carbide ceramic matrix composite.

In one embodiment x is more than 2, wherein M is more than 2 different transition metals selected from the group consisting of titanium, zirconium, hafnium, vanadium, niobium, tantalum, chromium, molybdenum, and tungsten.

In one embodiment the composite is a ternary carbide ceramic composite with x=2, M is represented by X and Y, wherein X and Y are different transition metals selected from the group consisting of titanium, zirconium, hafnium, tantalum, molybdenum, and tungsten.

In a preferred embodiment X and Y are different transition metals selected from the group consisting of titanium, zirconium, hafnium, tantalum, molybdenum, and tungsten.

Preferably, X is titanium and Y is tantalum.

Preferably, the alloy is a non-eutectic composition having a ratio of about 17.9 Ti-15.4 Ta-66.7 Si.

In one embodiment the Si-xM alloy is a non-eutectic composition.

In a preferred embodiment the $C_f/C$ composite has a porosity prior to infiltration of about 15 to about 60% by volume, more preferably about 20 to about 30% by volume.

Preferably, the infiltration and sintering step is performed through reactive melt infiltration.

More preferably, the infiltration and sintering step is performed through spark plasma sintering.

Preferably the infiltration and sintering step is performed at less than 2000° C., more preferably about 1600° C. to 1800° C.

Most preferably, the infiltration and sintering step is performed at about 1700° C.

According to a another aspect to the present invention there is provided a method of producing a ceramic matrix composite the method comprising the steps of providing a $C_f/C$ composite, providing a non-eutectic alloy composition comprising silicon and two or more transition metals selected from the group consisting of titanium, zirconium, hafnium, vanadium, niobium, tantalum, chromium, molybdenum, and tungsten, and infiltrating the non-eutectic alloy composition into the $C_f/C$ composite and sintering the composite to provide a carbide ceramic matrix composite.

Preferably, the infiltration and sintering step is performed through reactive melt infiltration.

More preferably, the infiltration and sintering step is performed through spark plasma sintering.

In one embodiment the infiltration and sintering step is performed at temperatures between the eutectic temperature and the liquidus line.

Preferably, the two or more transition metals are selected from the group consisting of titanium, zirconium, hafnium, tantalum, molybdenum, and tungsten.

More preferably, the transition metals are titanium and tantalum.

Preferably, the infiltration and sintering step is performed at less than 2000° C., more preferably about 1600° C. to 1800° C.

Most preferably, the infiltration and sintering step is performed at about 1700° C.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention will now be described in more detail with reference to the following non-limiting embodiments and figures in which:

FIG. 12 12a-12c shows enlargements of the micrographs of FIG. 11 at 1600° C., 1700° C., and 1800° C. respectively;

DETAILED DESCRIPTION OF A PREFERRED EMBODIMENT

Figure 1:
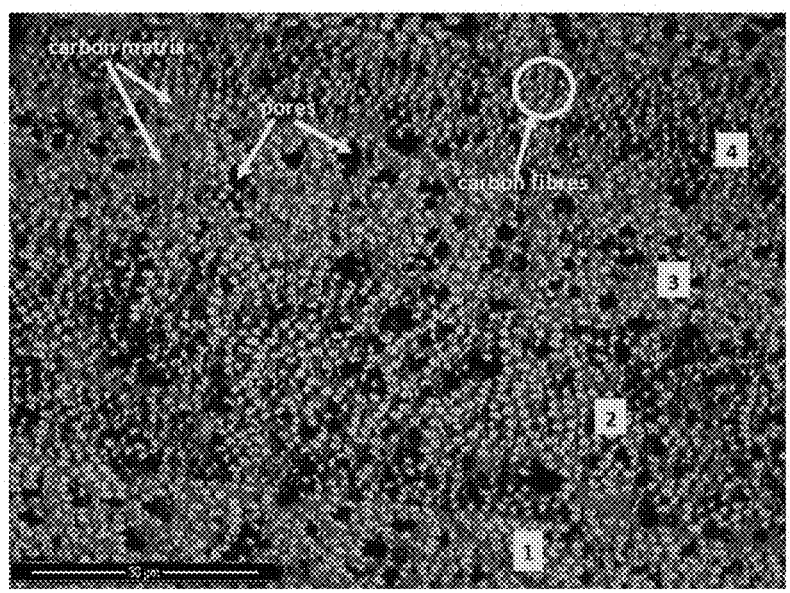
FIG. 1 shows an optical micrograph of the $C_f/C$ composite after 3 cycles of polymer infiltration and pyrolysis.

The present invention will now be described more fully hereinafter with reference to the accompanying figures, in which some of the non-limiting embodiments of the invention are shown.

The invention as described hereinafter should not be construed to be limited to the specific embodiments disclosed, with slight modifications and other embodiments intended to be included within the scope of the invention.

Although specific terms are employed herein, they are used in a generic and descriptive sense only and not for purposes of limitation.

As used herein, throughout this specification and in the claims which follow, the singular forms "a", "an" and "the" include the plural form, unless the context clearly indicates otherwise.

The terminology and phraseology used herein is for the purpose of description and should not be regarded as limiting. The use of the terms "comprising", "containing", "having", "including", and variations thereof used herein, are meant to encompass the items listed thereafter, and equivalents thereof as well as additional items.

The present invention provides for ultra-high temperature ceramic matrix composites of the formula $C_f/C$—SiC—xMC, wherein x is 2 or more, and a method to manufacture the composites. In one embodiment, the invention provides for an ultra-high temperature ternary carbide ceramic matrix composite of the formula $C_f/C$—SiC—XC—YC and its method of manufacture.

As used in the specification and claims "xMC" in the formula $C_f/C$—SiC—xMC should be understood to refer to the number of different transition metal carbides, and not the amount of carbide. Similarly, where "xM" is used it should be understood to refer to the number of different transition metals, and not the amount of transition metal.

The Carbon Fibre Reinforced Carbon ($C_f/C$) Composite

A skeletal $C_f/C$ composite was prepared, starting with a carbon cloth of poly(acrylic nitrile)-based or pitch-based origin, having woven or unwoven continuous fibres, or even discontinuous fibre.

Thermoset resole resins, including phenolic resin, epoxy resin, polyarylacetylene resin, or polyamide resins are infiltrated into the carbon cloth skeleton so that they surround the individual fibres and tows contained in the skeleton. Preferably, the thermoset resin is selected from the group consisting of phenolic resin, polyarylacetylene resin, and polyimide resin. In a preferred embodiment of the invention the thermoset resole resin is phenolic resin.

Curing and subsequent pyrolysis of the resin are achieved by heat treatment. Curing allows cross-linking to occur in the polymers, while pyrolysis allows carbonation to occur in order to obtain a residual carbon matrix.

Infiltration, curing and pyrolysis steps are performed at least once until the target density and porosity of the $C_f/C$ composite has been achieved. Preferably, more than one cycle of polymer infiltration, curing and pyrolysis is performed, more preferably more than two cycles of polymer infiltration, curing and pyrolysis is performed, and most preferably three or more cycles of polymer infiltration, curing and pyrolysis is performed.

The open porosity of the $C_f/C$ composite should preferably be in the range of about 15% to about 60%. Preferably, the open porosity in the carbon fibre reinforced carbon matrix is between about 20% and about 30%. In a particularly preferred embodiment the porosity is in the range of about 20 to about 22%. The porosity is considered important as it provides the space for the transition metal alloy to be infiltrated into the carbon composite. The pores have to be of optimal diameter in order to allow the infiltrant to wick through by capillary forces. It is therefore important that pore parameters be optimised for the particular selection of transition metal alloy to be infiltrated.

The ultra-high temperature ternary carbide ceramic matrix composite of the present invention is manufactured based on a starting carbon fibre reinforced carbon ($C_f/C$) composite skeleton.

Example 1

The initial $C_f/C$ composite was prepared using carbon fibre cloth (200 g/m², 1000 tex, 2/2 twill, AMT, Johannesburg) and phenolic resin (Resole, SI Group, Durban). Other thermoset polymers may also be used based on the particular application requirements, and the desired final product specification. The selection may be informed by factors such as viscosity, fibre wetting, potential carbon yield, and shrinkage during heat treatment.

Examples of other thermoset resins that may be used in high temperature applications include epoxy resin, polyarylacetylene resin, and polyimide resin.

Carbon fibre cloth was cut into 100 mm×100 mm squares. The preform was constructed of 10 laminates arranged in alternating 0° and 90° arrays. The impregnation of the carbon fibre cloth was performed by hand lay-up followed by vacuum bagging. In the hand lay-up step, the composite was built up by sequentially impregnating each laminate with resin and laying it up on top of the subsequent impregnated laminate. Phenolic resin (SI Group SS1204) was mixed with 5 wt. % hardener (SI Group SS1028 Catalyst)

and stirred thoroughly. The hardener served the purpose of initiating crosslinking in the resin during curing.

The impregnated laminates were then sealed in an extruded sheet of plastic bag and vacuum was applied. Release film, release fabric and breather cloth were laid up between the composite and the vacuum bag. The breather cloth, a synthetic 'wool' material, was used to achieve uniform pressure onto the composite, and to absorb any excess resin from the preform. The nylon based release fabric ensured a smooth finish on the composite, while the plastic release film was used to ensure a non-stick contact between the laminates and the vacuum bagging materials.

As vacuum was applied to the system resin infiltrated through the laid-up carbon fibre cloths. When the laminates got saturated with resin, excess resin was collected by the breather cloth and the rest accumulated in the tubing connecting to the vacuum pump. Infiltration was allowed to complete until the resin was beginning to set. Time was allowed for the resin to initially cure under the same vacuum bagging conditions. The total time for vacuum bagging and initial resin curing was about 6 hours.

Preform discs (diameter about 20 mm, thickness about 3 mm) were cut out of the resultant composite before undergoing heat treatment. The heat treated preforms were then re-impregnated with phenolic resin. Unlike the hand lay-up method for the initial impregnation step, the preform discs were immersed in resin in a vacuumed bagged container.

The resin-impregnated preform discs were cured in an oven set at 100° C. for 8 hours in air. Both the heating and cooling rates were at 2° C./min.

Pyrolysis was performed in order for carbonization to occur. This involved evaporating all the molecular constituents of the phenolic resin, except for elemental carbon, in a tube furnace. In this embodiment of the invention pyrolysis was performed at 1000° C. for 1 hr in argon (2 mL/s) at 1.5 bar. Heating and cooling rates were set at 5° C./min. The heating rate would be determined based on the temperatures at which the gas evolves for the particular embodiment. This could be controlled by DTA/TG measurements. In temperature intervals were no gas evolves, the heating rate could be as high as 50 or 100 K/min. In the intervals were the gas releases, the heating rate must be low enough to avoid damage due to formation of internal gas pressure.

Three cycles of polymer infiltration and pyrolysis (PIP) were performed to impregnate the carbon preform with a carbonaceous matrix.

The density and porosity characteristics of the C$_f$/C composites were evaluated by the Archimedes wet/dry method, quantitative microscopy, mercury intrusion porosimetry (MIP) and gas adsorption by the Branneur-Emmett-Teller (BET) method. The phases in the composite were determined by Raman spectroscopy and XRD, while the microstructure was observed under the scanning electron and optical microscopes.

After performing 3 cycles of phenolic resin infiltration and pyrolysis (PIP), a crumpled and folded leaf microstructure in the matrix of the C$_f$/C composite was observed which is characteristic of amorphous carbon.

The duration of curing was important in producing the desired microstructure in the final C$_f$/C composite. Curing phenolic resin for about 8 hours produced the most consistent and open porosity. Prolonged durations of curing at 100° C. resulted in the oxidation of the phenolic resin, while abridged durations resulted in an insufficiently cross-linked polymer in the matrix. Preferably curing should be done at about 100° C. and 250° C. for about 0.1 to 24 hours. During the carbonization process, it was observed that temperatures of between 250° C. and 350° C. resulted in delaminated C$_f$/C composite discs, with a success rate of non-delaminated C$_f$/C composite discs after carbonization of about 56%.

Distribution of the matrix within the fibre bundles was studied. Referring to FIG. 1, it can be seen that the fibres were surrounded by the carbon matrix, and were uniformly distributed therein. In FIG. 1, the white phase represents the fibres, the grey phase represents the matrix, and the black phase represents the pores in the composite. The microstructure shows a uniform network of pores throughout the composite.

Figure 2:
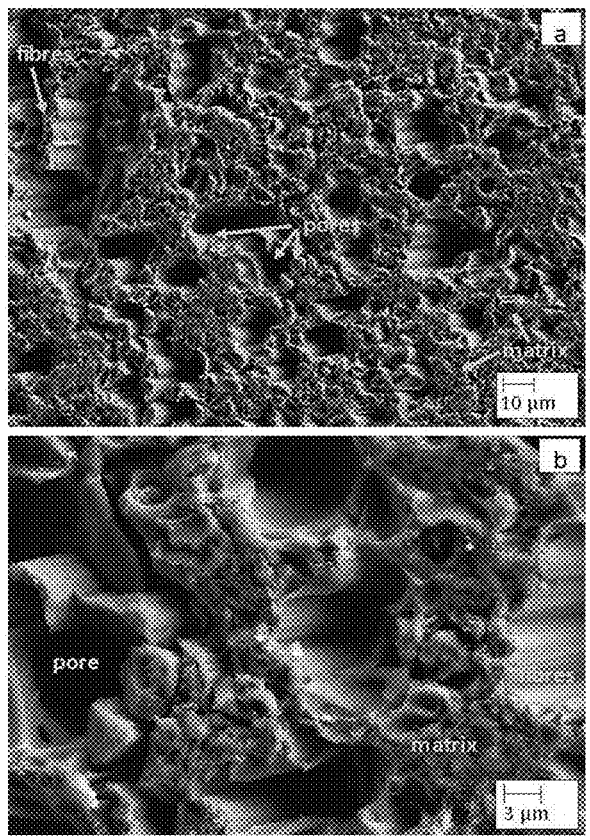
FIG. 2 shows a cross-sectional SE-SEM microstructure of the $C_f/C$ composite.

The microstructure further shows how the resin infiltrated into the fibre tows and the individual fibres. FIG. 2(a) shows a multiplicity of pores showing how they developed along the length of the fibre tows. The amorphous nature of the matrix is clearly shown in FIG. 2(b) which is a magnification of FIG. 2(a). The crumpled and folded microstructure of the resin is evident especially at the intertow sites where the resin seemed to have lodged more than anywhere else in the composite. FIG. 2 also shows how the vacuum bagging technique facilitated an even distribution of the carbon matrix within the carbon fibre network.

Figure 3:
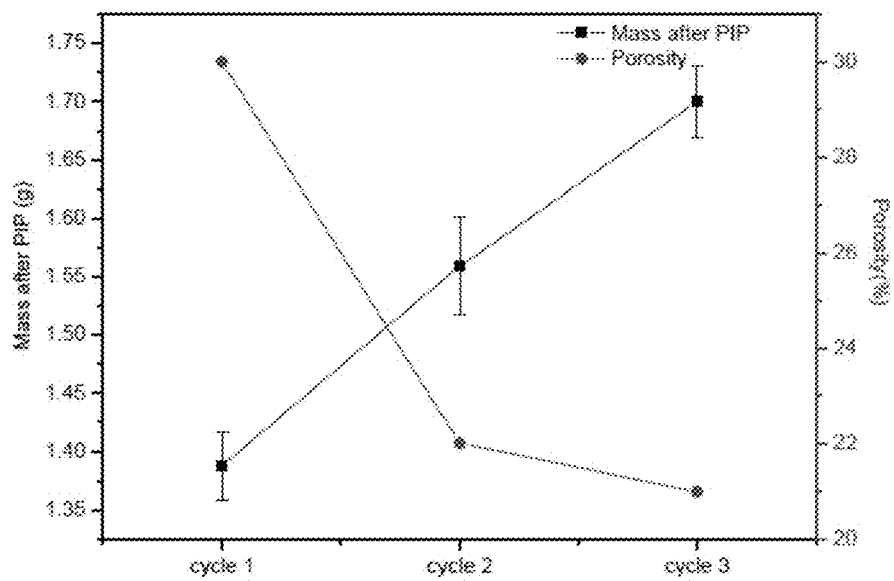
FIG. 3 shows a graphical representation of the mass of the $C_f/C$ composite and its porosity against the number of polymer infiltration and pyrolysis (PIP) cycles.

FIG. 3 is a graphical representation of the porosity and mass of the C$_f$/C composite against the number of polymer infiltration and pyrolysis (PIP) cycles. It can be seen that the porosity of the composite started to level off (20-22%) from the second PIP cycle to the third PIP cycle. In addition, the rate of mass gain with successive PIP cycles slowed, indicating that an optimum cycle count versus mass/porosity indicators could be determined. In the embodiments of the invention described herein, 3 PIP cycles were preferred. The change in porosity between the second and the third cycles was marginal and this signified that, for this embodiment, at the third cycle the maximum serviceable infiltration and pyrolysis efficiency had been attained in the composite.

Information on the macropores in the C$_f$/C composite was gathered from the mercury intrusion porosimetry (MIP) results, and information about the micropores was gathered from the BET results. Average pore diameters for the C$_f$/C composites, obtained by MIP, are shown in Table 1.

TABLE 1

Resultant pore volume, average pore diameter and density of the C$_f$/C composite after successive PIP cycles.

| PIP Cycles | 1 | 2 | 3 |
|---|---|---|---|
| Pore Volume (%) | 30% | 22% | 21% |
| Average pore diameter (μm) | 0.076 | 0.056 | 0.044 |
| Density (g/cm$^3$) | 1.51 | 1.53 | 1.54 |

Figure 4:
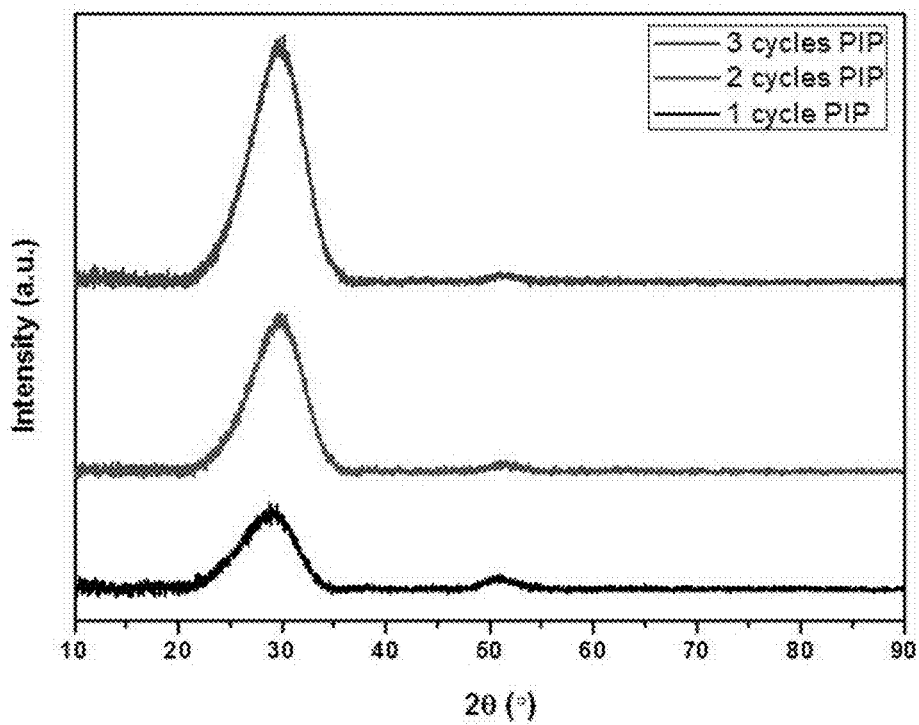
FIG. 4 shows XRD pattern of $C_f/C$ composites after successive PIP cycles.
Figure 5:
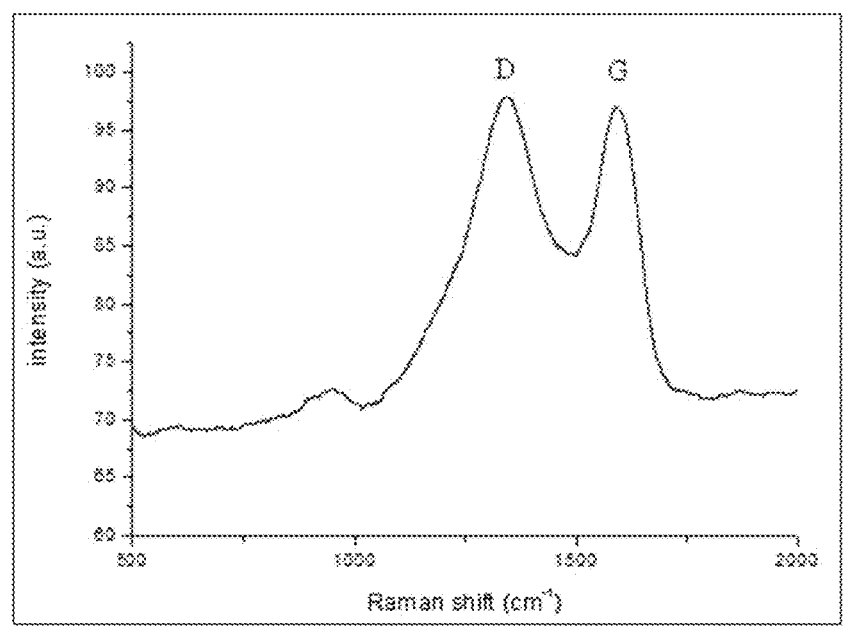
FIG. 5 shows the Raman spectra of a $C_f/C$ composite which underwent 3 PIP cycles.

FIG. 4 shows XRD spectra of C$_f$/C composites after each successive cycle of PIP. FIG. 5 shows two peaks with a Raman shift around 1360 and 1600 cm$^{-1}$ coinciding with the well-known Raman G and D carbon bands respectively. The semi-quantitative analysis of the Raman shifts and the XRD crystallite sizes indicated a highly disordered non-graphitic structure.

The Si-xM Alloy

The formula Si-xM indicates a mixture, or composition, comprising Si and at least two different transition metals (M) which are selected from the group consisting of titanium, zirconium, hafnium, vanadium, niobium, tantalum, chromium, molybdenum, and tungsten. In one embodiment of the invention M is two different transition metals X and Y (i.e. Si—X—Y), with X and Y being selected from the group consisting of titanium, zirconium, hafnium, vanadium, niobium, tantalum, chromium, molybdenum, and tungsten. In other embodiments of the invention the alloy mixture may contain more than 2 different transition metals. In it anticipated that in these embodiments the presence of additional metals may further reduce the infiltration temperature and may improve the infiltration without being harmful to the final composite properties.

In one embodiment according to the present invention there is provided an ultra-high temperature $C_f/C$ composite comprising the ternary carbide mixture SiC—XC—YC by infiltrating an Si—X—Y alloy into a $C_f/C$ composite.

The alloy to be infiltrated may comprise at least one disilicide of the group IV transition metals (Ti, Zr, Hf), at least one disilicide of the group V transition metals (V, Nb, Ta), and/or at least one disilicide of the group VI transition metals (Cr, Mo, W).

In a preferred embodiment of the invention the composition of the transition metal silicides to be used in preparing the alloy to be infiltrated may be determined by the position of the eutectic point in the phase diagram of the particular ternary system. The present invention embodies the realization of a carbides matrix composite through non-eutectic composition infiltration. Reactive melt infiltration is conventionally performed at an alloy's eutectic composition and at temperatures above that of the eutectic point. The eutectic temperature is the lowest point in the phase diagram at which a solid-liquid phase change occurs. Therefore, a eutectic composition is the composition of the alloy at which this phase change occurs. Non-eutectic infiltration has the advantage of defying the compositional constraints imposed on the infiltrant when performing eutectic infiltration.

Example 2

In one embodiment of the invention there was prepared a Si—X—Y alloy wherein X is tantalum (Group V) and Y is titanium (Group IV). $TaSi_2$ and $TiSi_2$ powders were weighed before mixing. The initial mixture contained 17.9 at. % of elemental Ti, 15.4 at. % of elemental Ta and 66.7 at. % of elemental Si. The powders were characterised for morphology by SEM and particle size by laser diffraction spectroscopy. The phases in the silicide powders were characterised by XRD.

The initial powders were mixed using the Fritsch Planetary Mono Mill PULVERISETTE in order to allow the two powders to mix to a homogeneous composition. The powders were loaded into a 250 ml agate milling pot together with agate milling balls of diameter 10 mm. Hexane solvent was added to allow wet grinding to occur. 120 ml of hexane was used, considering the capacity of the vial (250 ml).

Wet milling was appropriate as it is known to aid the dissociation of the agglomerated particles. Agate was selected because of the soft milling conditions which were used. The low density of agate meant that the mixing efficiency was greater than otherwise where most of the energy is used for powder particle size reduction. A ball-to-powder weight ratio (BPR) of 2:1 was adopted, using a total of 30×1 cm-diameter agate balls. Milling, in the presence of a dispersant, was important in breaking-up agglomerates observed for the $TaSi_2$ powder, thus increasing the surface area of contact with the $TiSi_2$ powder during compaction.

Figure 6:
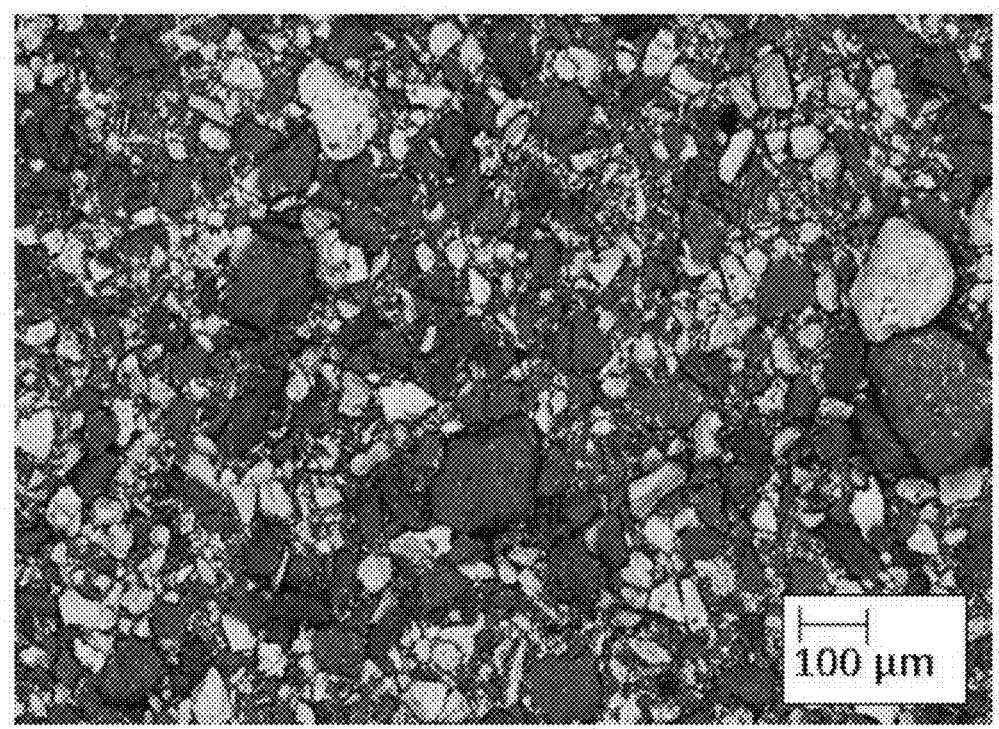
FIG. 6 shows a SEM micrograph for mixed loose titanium silicide ($TiSi_2$) and tantalum silicide ($TaSi_2$) powders.

FIG. 6 shows a satisfactory powder mix of $TaSi_2$ and $TiSi_2$. From the micrograph in FIG. 6 it can be seen how most of the $TaSi_2$ particle clusters were broken up and dispersed during milling. The small-sized particles fitted well between the bigger particles interstices. The white phase represents $TaSi_2$ and the black phase represents $TiSi_2$ Upon completion of milling the mixture was dried by rotary evaporation to remove the solvent. The solvent was evaporated at 68 rpm and 78° C. The dried powder was sieved and separated from the milling balls.

Powder was weighed into 10 g batches and compacted at room temperature by dry uniaxial pressing. As a result of the relatively high density of the powders, high pressing pressures of up to 70 MPa were applied for consolidation of powder particles to occur. Compaction was necessary for the subsequent step of alloying the powders by arc melting to preserve the integrity of the powders during the alloying process. Avoiding the addition of binding aids was particularly important as most binders, although usually burnt away, contain carbon and silicon.

Button arc melting was performed on the green compacts using an arc melting furnace. The arc was created using a copper electrode with a tungsten carbide tip. Buttons were contained in a water cooled copper hearth. Ingots were taken out after three melting cycles which involved cold turning.

Each batch consisted of six mixed powder compacts of 10 g each; each button being placed into one of the depressions of the copper hearth. A titanium getter was included in the batch and placed in the central button to act as a deoxidizer. Degassing was effected by first evacuating the chamber using a vacuum pump and maintaining the vacuum at −0.83 bar for 5 minutes. Purified argon was pumped into the chamber to flush out atmospheric gases. Three cycles of degassing and flushing were required to expel all possible contaminants, including oxygen, from the chamber.

Arc melting was conducted in an argon atmosphere. The furnace was rated at 100-400 A (voltage 44V), the exact amount flowing into the furnace being determined by the transformer setting. 3-phase electricity with a frequency of 50 cycles was used. The arc was initiated by striking the hearth with the electrode tip. The electrode was immediately directed onto the titanium ingot which underwent localized melting and acted as an oxygen getter. Oxygen is unwanted during arc melting as it has deleterious effects on the reactions that occur. Melting of the powders occurred when the electrode tip was directed at a particular button. The tip was manoeuvred in small circles until the powder compact had melted satisfactorily and an ingot was formed in the button. Rapid cooling was effected in order to freeze the alloy composition and prevent phase segregation.

Arc melting was particularly useful in terms of inclusion and contaminants. Any inclusions and/or dirt in the Ta—Ti—Si system floated at the top of the ingot as slag. The slag was removed from the ingots by sand blasting.

The Si—Ti—Ta alloy was pulverised to a powder with an average particle size of about 10 microns using a zip crusher. The powder was characterised for morphology by SEM and particle size by laser diffraction spectroscopy. The phases in the alloy were characterised by XRD (Co K(α)-radiation) and EDS.

Figure 7:
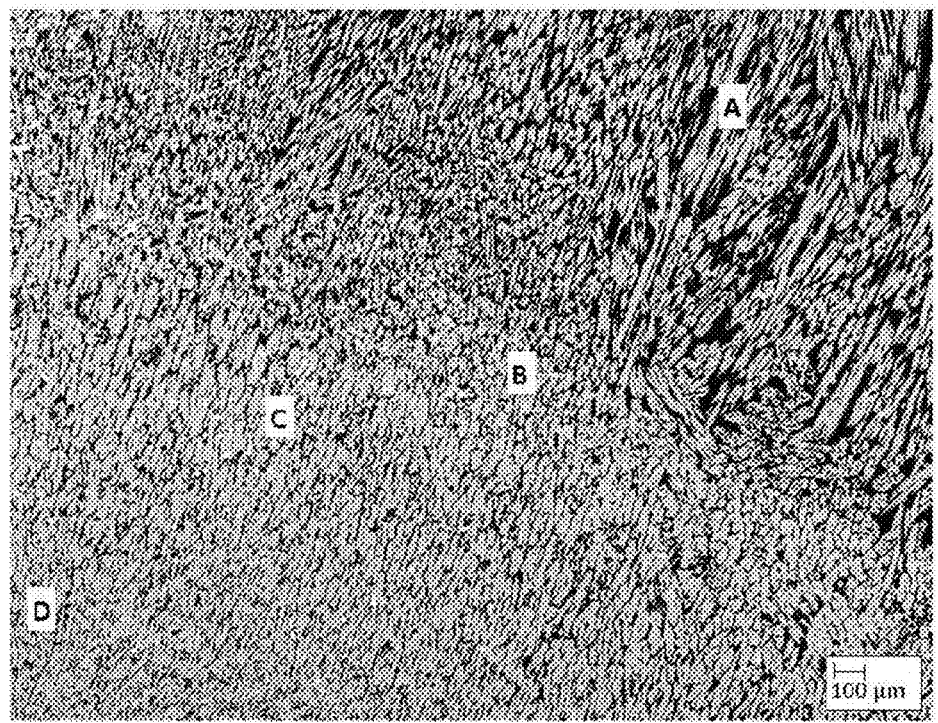
FIG. 7 shows a backscattered micrograph of a Si—Ti—Ta alloy according to one embodiment of the invention showing an overview of the disilicide alloy microstructure.

An overview of the microstructure of the Si—Ti—Ta alloy is shown in FIG. 7. Regions A, B, C and D represent the variations in the shapes of the alloy grains. Region A represents the central region of the ingot. The microstructure of this region consists of acicular shaped grains with lengths approaching 100 μm, arranged in a basket weave-like manner. Region B is the transition region between the Region A and Region C microstructure. The grains are almost equi-axed and cusped in shape. The grains in Region C have no clear transverse demarcations, although the elongated shape of the grains is obvious. Region D is located at the peripheries of the ingot and the grains have an element of arborescence, i.e. grains that appear to have grown and branched from one another.

Figure 8:
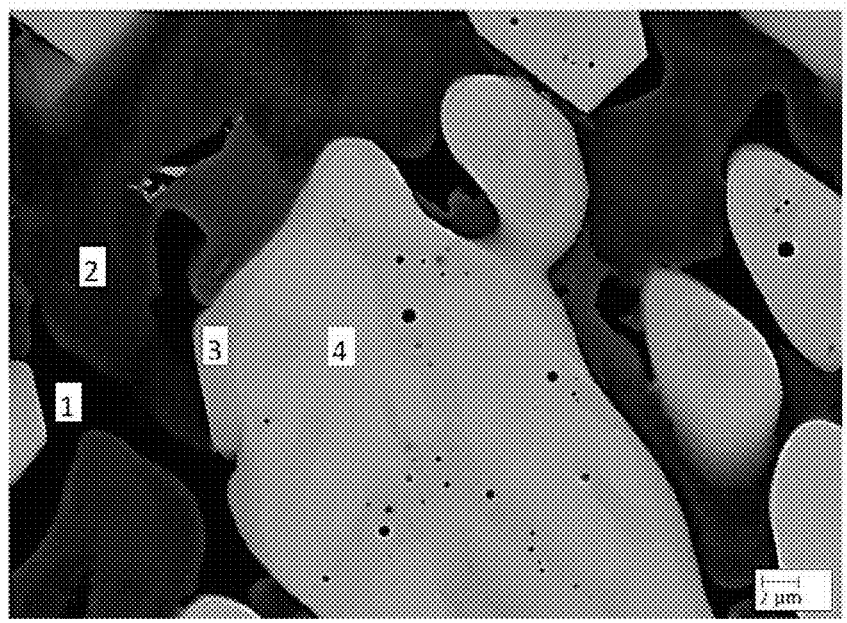
FIG. 8 shows a high magnification SEM image showing the different phases in a polished cross-section of a Si—Ti—Ta alloy.

Energy dispersive spectroscopy (EDS), together with magnification of the micrograph of FIG. 7 shown in FIG. 8, provide better detail on the distribution of phases in the alloy.

The EDS results shown in Table 2 below suggest the following phases (positions 1-4 indicated in FIG. 8): free silicon on position 1 and (TaTi)Si$_2$ solid solution on position 3. Although challenging to identify conclusively, the phases on positions 2 and 4 may possibly contain free silicon and 5-3 silicides (either Ti$_5$Si$_3$ or Ta$_5$Si$_3$, or both).

TABLE 2

EDS results obtained from the positions 1-4 of the SEM image of the Si—Ti—Ta alloy shown in FIG. 8.

| Position on micrograph | Atomic % | | |
|---|---|---|---|
| | Si | Ti | Ta |
| 1 | 100.0 | 0 | 0 |
| 2 | 75.6 | 24.2 | 0.2 |
| 3 | 69.6 | 15.3 | 15.1 |
| 4 | 69.5 | 8.0 | 22.5 |

Figure 9:
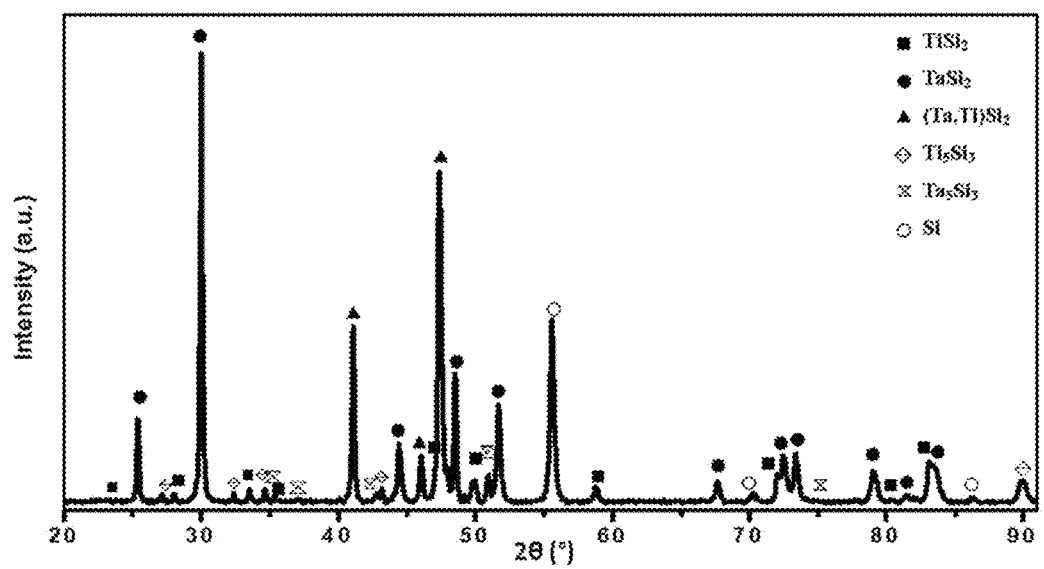
FIG. 9 shows a X-ray diffraction pattern for alloyed $TaSi_2$—$TiSi_2$ powders.

FIG. 9 shows an XRD pattern of the Si—Ti—Ta alloy. The XRD analysis of the alloy revealed the presence of TaSi$_2$, TiSi$_2$, Ti$_5$Si$_3$, Ta$_5$Si$_3$ and free silicon.

The TaSi$_2$ from the present investigation, which is typified by hexagonal lattice of CrSi$_2$ (C40), had the lattice parameters of a=b=4.778 Å and c=6.565 Å. There was a slight shift of the a and b parameters from the typical a=b=4.783 Å (Goldschmidt, 2013: 336), as also shown in the XRD pattern by a shift of the TaSi$_2$ peaks to the left by about 0.5°. This signifies a lattice expansion due to the insertion of TiSi$_2$ into the crystal structure.

The presence of Ti$_5$Si$_3$ was positively identified in addition to that of the disilicide (TiSi$_2$). The lattice parameters of the tetragonal crystals of Ti$_5$Si$_3$ were a=b=7.448 Å and c=5.114 Å. Similarly, Ta$_5$Si$_3$ was positively identified and had the following lattice parameters: a=b=9.880 Å and c=5.060 Å. Thus the Ta$_5$Si$_3$ has larger unit cells than Ti$_5$Si$_3$.

Free Si islands (black phase in FIG. 13) were seen to occur with attachments to the bright phase grain boundaries. This phase of Si islands, which was confirmed by EDS, had peaks closely associated with the TaSi$_2$ peaks.

The C$_f$/C—SiC-xMC Composite

The carbide ceramic matrix composite of the invention comprises C$_f$/C—SiC-xMC, with x being at least 2, and wherein the metal carbides MC are carbides of transition metals with M being at least two different transition metals selected from the group consisting of titanium, zirconium, hafnium, vanadium, niobium, tantalum, chromium, molybdenum, and tungsten. In one embodiment according to the invention x is 2 and M, represented by X and Y, are two different transition metals selected from the group consisting of titanium, zirconium, hafnium, vanadium, niobium, tantalum, chromium, molybdenum, and tungsten.

In one embodiment a mixture or composition comprising silicides of transition metals X and Y, with X and Y being selected from the group consisting of titanium, zirconium, hafnium, vanadium, niobium, tantalum, chromium, molybdenum, and tungsten, is infiltrated into a C$_f$/C composite produced by polymer infiltration and pyrolysis of a carbon fibre preform. The infiltration may be performed by way of pressureless infiltration, or applied-pressure infiltration. Different sintering techniques could be used, for example, spark plasma sintering (SPS) or hot pressing.

Example 3

As described above, in one of the embodiments of the invention a non-eutectic composition alloy (Si—Ti—Ta) is allowed to infiltrate into the pores of the C$_f$/C composite. Each elemental constituent reacts with the carbon matrix, resulting in a ternary carbides matrix. Ample time, for example at least 30 minutes, is allowed for reactive melt infiltration to occur, wherein equilibration of phases occurs. However, infiltration can be carried out in several seconds up to several hours. By increasing the infiltration time the amount of residual silicide would be reduced. Temperatures between the eutectic temperature and the liquidus line are used in performing spark plasma sintering. Temperatures close to the liquidus line are preferred when performing non-eutectic infiltration.

The closer the alloy composition is to the eutectic point the less likely is the dissociation of the solid solution formed during infiltration. However, infiltration of a partially molten alloy is likely to occur. The solid-liquid fractions can be determined by the Lever Rule. It is also known that the calculated fractions are valid only if the alloy melting occurs in equilibrium. The homogeneity of the matrix increases with increasing RMI temperature.

Reference to the disilicides systems phase diagrams by Kudlieka and Nowotny (1956), in which the following Group IV-Group V combinations are presented: TiSi$_2$—TaSi$_2$ and ZrSi$_2$—TaSi$_2$. In terms of Group IV-Group VI systems, the following combinations are presented: ZrSi$_2$—CrSi$_2$ and ZrSi$_2$—MoSi$_2$. In terms of Group V-Group VI systems, the following combinations are presented: TaSi$_2$—MoSi$_2$ and TaSi$_2$—WSi$_2$. Ternary transition metal (Group IV-Group V-Group VI) disilicide systems are presented for the following combinations: TiSi$_2$—TaSi$_2$—CrSi$_2$; TiSi$_2$—TaSi$_2$—MoSi$_2$; and TiSi$_2$—TaSi$_2$—WSi$_2$.

Figure 10:
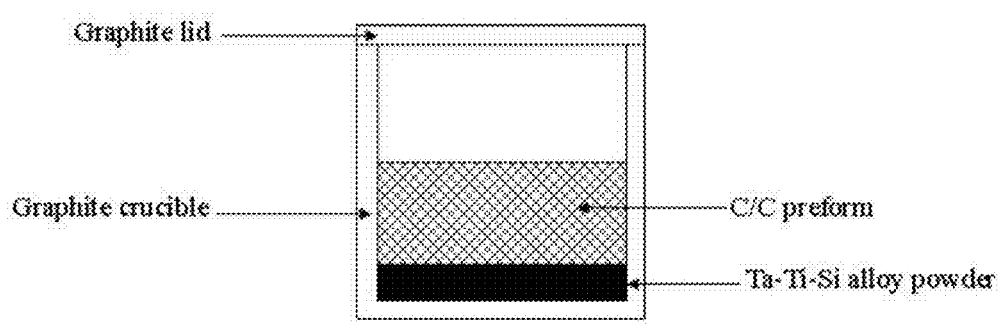
FIG. 10 shows a schematic representation of a closed graphite crucible set-up designed for pressureless heat treatment by spark plasma sintering.
Figure 11:
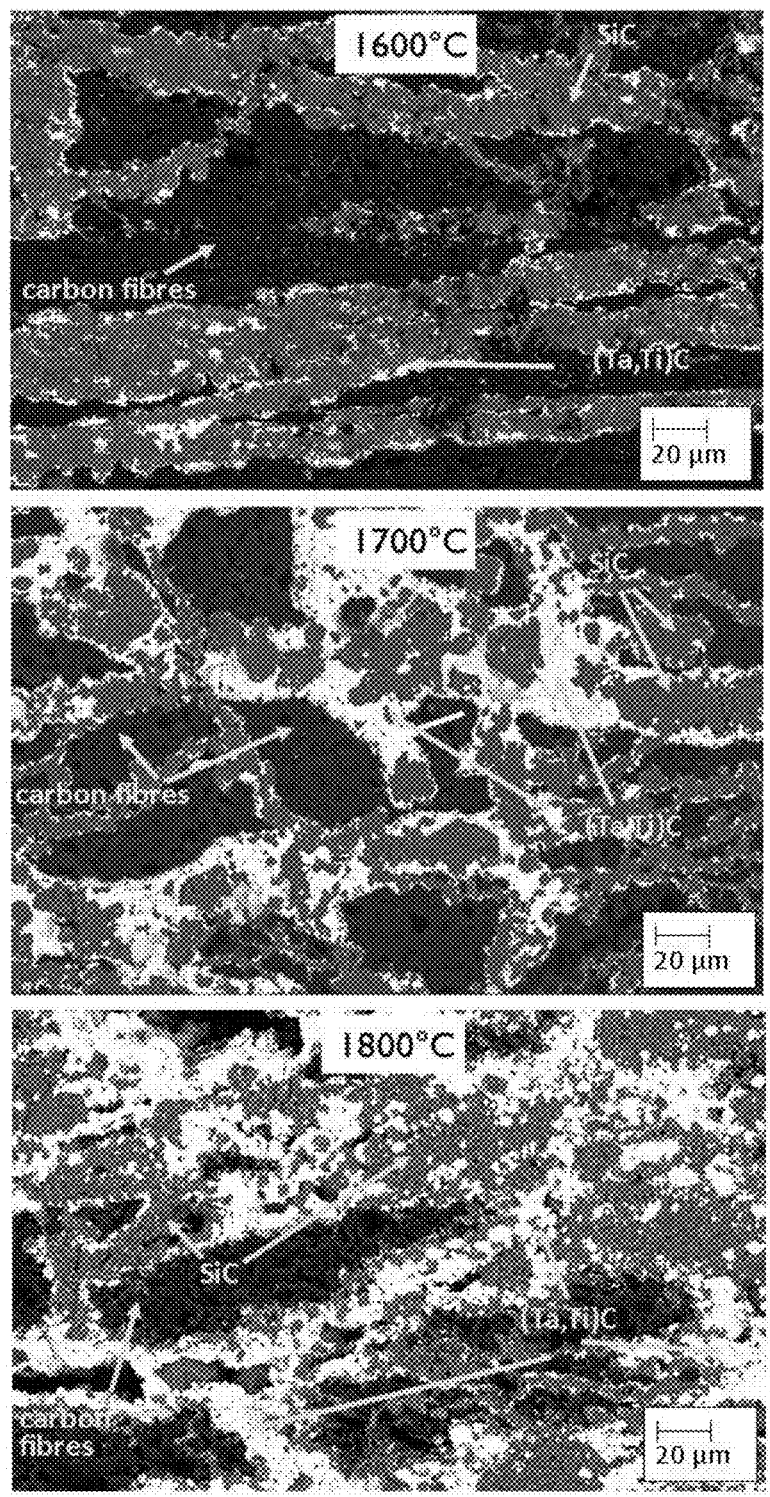
FIG. 11 shows a SEM micrographs (BSE-Detector) of cross-sections of composites comprising $C_f/C$—SiC—TiC—TaC comparing the microstructures obtained by increasing the temperature for reactive melt infiltration by spark plasma sintering for 30 minutes.

Pressureless plasma assisted sintering was performed using a set up depicted in FIG. 10, wherein the closed graphite crucible was coated with hexagonal boron nitride (HBN) on the inside which contained the alloy and C$_f$/C composite. In one embodiment of the present invention a non-eutectic (17.9Ti-15.4Ta-66.7Si) alloy was prepared by arc melting from TaSi$_2$ and TiSi$_2$ powders. When the non-eutectic alloy was infiltrated by reactive melt infiltration (RMI) spark plasma sintering (SPS) into C$_f$/C composite preforms at 1600° C., 1700° C. and 1800° C. These reactions gave the microstructures shown in FIG. 11. From FIG. 11, it is evident that a gradient matrix was realised at 1600° C. where the formation of carbides [SiC and (Ta,Ti)C] is limited. At 1700° C. carbides of tantalum and titanium, which are seen as pronounced islands in the predominantly SiC matrix, were formed. At 1800° C. tantalum and titanium carbides have a more pronounced presence in the matrix. However, at this temperature the carbon fibres in the composite seem to have fused with the matrix.

The carbon matrix in the C$_f$/C composite dissolves into the alloy upon contact during infiltration. Reaction ensues, with SiC rapidly forming a thin film at the C matrix/alloy interface. The formation of bulk SiC and MC, is this example XC and YC follows, being influenced by the rate of carbon diffusion through the formed SiC layer. The pentasilicides (X$_5$Si$_3$, Y$_5$Si$_3$) can react with free Si (realised when disilicides form trisilicides) to form the disilicides (XSi$_2$, YSi$_2$) which will further react as aforementioned, or may react directly with the carbon to form carbides. Ultimately, solid solutions of the transition metal carbides are formed owing to the occurrence of interstitial diffusion common to such elements. Typically, the (X,Y)C phase precipitates out of the predominantly SiC matrix. At lower temperatures a gradient matrix of the solid solution of transition metal carbides [(X,Y)C], SiC, and transition metal silicides $(X,Y)_x Si_y$] are formed. It is to be understood that not all infiltrated silicide is reacted to carbides. It will be clear from the examples discussed here that this will be dependent on a number of factors, including the reaction time and reaction temperature. Preferably more than 60 vol. %, more preferably more than 70 vol. %, and even more preferably more than 95% of the silicides are converted to carbide.

Figure 12A:
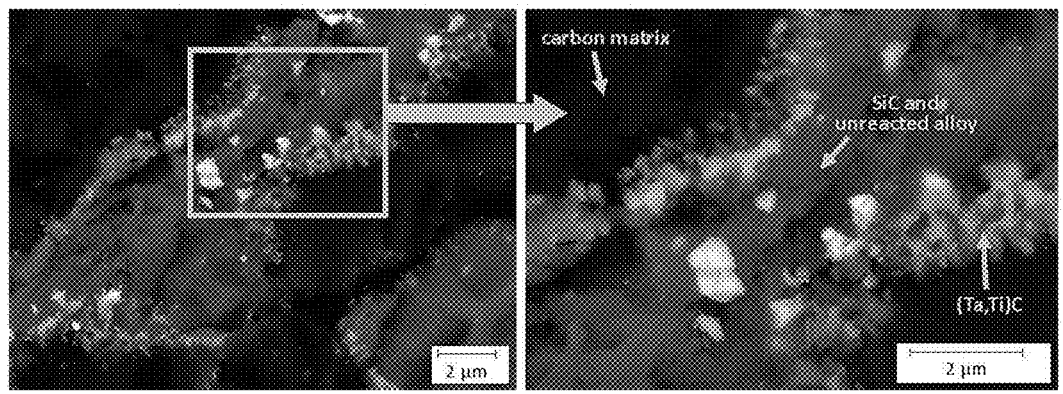

Referring now to FIG. 12a, in the $C_f/C$—SiC—TiC—TaC comprising composite produced at 1600° C. a white phase, which precipitated close to the carbon matrix/alloy interface, was observed. Here the (Ta,Ti)C phase precipitated out of the predominantly SiC matrix (formed according to Reaction 1) containing unreacted $(Ta,Ti)_x Si_y$. Thus a gradient matrix of the solid solution of transition metal carbides [(Ta,Ti)C], SiC, and transition metal silicides $(Ta,Ti)_x Si_y$] was formed.

$$Si + C \rightarrow \beta\text{-}SiC \qquad (1)$$

Figure 13:
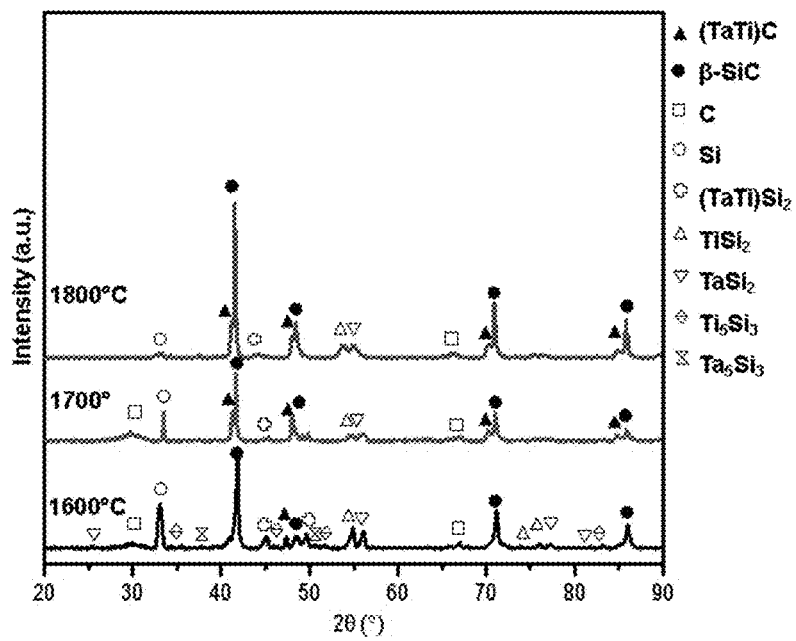
FIG. 13 shows XRD pattern of composites comprising $C_f/C$—SiC—TiC—TaC whereby reactive melt infiltration was performed by spark plasma sintering at 1600° C., 1700° C. and 1800° C. for 30 minutes.

FIG. 13 shows the existence of the silicide phases (TaSi$_2$, Ta$_5$Si$_3$, TiSi$_2$, Ti$_5$Si$_3$) and free silicon (Si) in the diffractogram in which RMI was performed at 1600° C. Si and β-SiC show to be the main phases dominating the obtained pattern. C and (Ta,Ti)C were also identified. For higher infiltration temperatures also α-SiC can be formed.

Figure 12B:
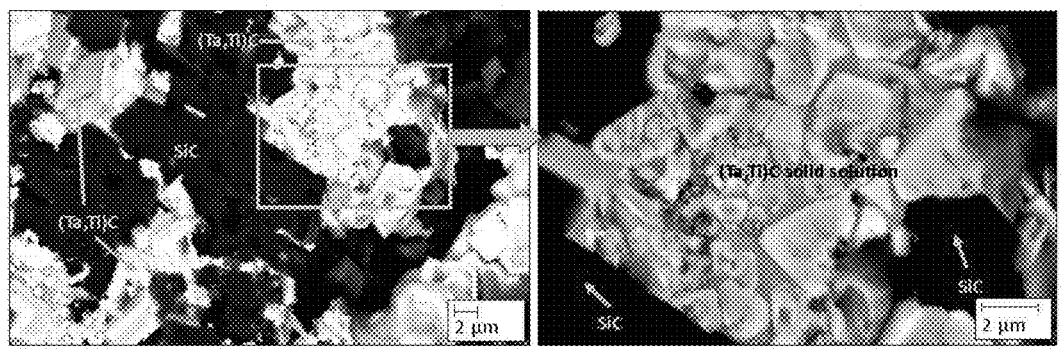

FIG. 12b reveals the existence of more pronounced dissolution of phases in one another than in the phases shown in FIG. 12a. The bright white grains are not strictly distinct from the light grey phase contiguous to the grains. From the EDS analysis performed on FIG. 12b, the light grey phase is silicon-rich, with 20.9 at. % Si [the rest being C, Ta and Ti]; while the bright white phase had the least silicon, with 4.8 at. % Si [the rest being C, Ta and Ti]; and the dull white phase at about 10.9 at. % Si [the rest being C, Ta and Ti].

Thus, the silicides solid solution reacted with carbon according to the reactions shown in Reactions 2-6:

$$TaSi_2(l) + 3C(s) \rightarrow TaC(s) + 2SiC(s) \qquad (2)$$

$$TiSi_2(l) + 3C(s) \rightarrow TiC(s) + 2SiC(s) \qquad (3)$$

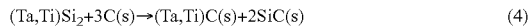
$$(Ta,Ti)Si_2 + 3C(s) \rightarrow (Ta,Ti)C(s) + 2SiC(s) \qquad (4)$$

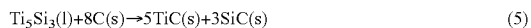
$$Ti_5Si_3(l) + 8C(s) \rightarrow 5TiC(s) + 3SiC(s) \qquad (5)$$

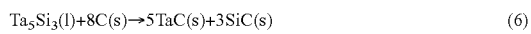
$$Ta_5Si_3(l) + 8C(s) \rightarrow 5TaC(s) + 3SiC(s) \qquad (6)$$

Alternatively, for Reactions 5 and 6, a possibility also exists of having the 5-3 silicides reacting with the silicon phase before infiltration into the carbon preform to give disilicides (Reactions 7-8). The resultant disilicides then react with the carbon matrix as given in Reactions 2-4.

$$Ti_5Si_3 + 7Si(s) \rightarrow 5TiSi_2(l) \qquad (7)$$

$$Ta_5Si_3 + 7Si(s) \rightarrow 5TaSi_2(l) \qquad (8)$$

Figure 12C:
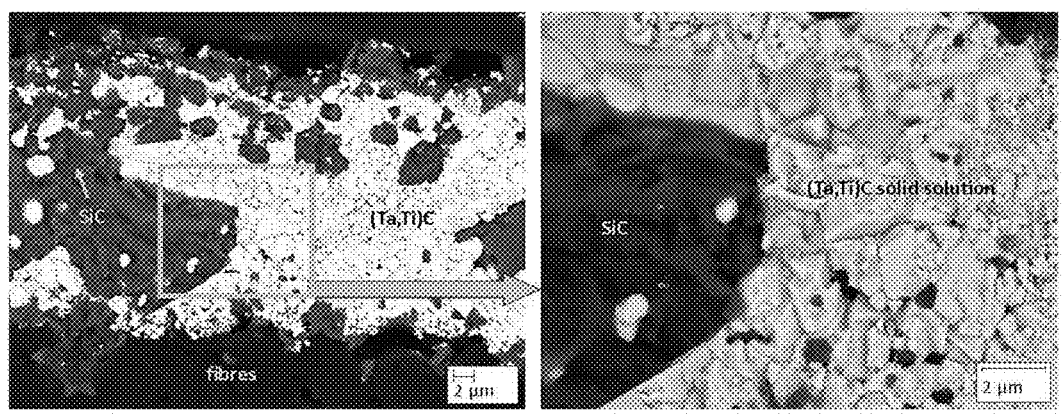

FIG. 12c shows a rather homogeneous matrix compared to the microstructure of the $C_f/C$—SiC—TiC—TaC comprising composite heat treated at 1600° C. (FIG. 12a). The white phase is more extensively distributed in the SiC milieu (more clearly in FIG. 12c). The reacted alloy/carbon matrix interface shows a band of predominantly SiC. This is similar to the evidence presented in the couple studies results presented in foregoing section. This occurrence is proof that the formation of the transition metal carbides is driven by the diffusion of carbon in the alloy.

Referring now to the grouped diffraction patterns of FIG. 13 for the composites comprising $C_f/C$—SiC—TiC—TaC heat treated at 1600° C., 1700° C. and 1800° C. UHTCs:

SiC has the most pronounced peaks still, as in the other two patterns for the 1600° C. and 1700° C. UHTCs. Shouldering the SiC peaks are the TaC, TiC and (Ti,Ta)C phase peaks—that is why the SiC peaks have broad bases and narrow tips. For the purpose of presentation, TaC and TiC peaks have not been labelled on the diffractogram. These have been collectively labelled as (Ti,Ta)C. These peaks are clustered in the respective order of TaC, (Ti,Ta)C, SiC and TiC. The (Ti,Ta)C peaks are consistently more inclined to the TiC peaks than the TaC peaks. This trend suggests that the (Ti,Ta)C contains TaC in higher proportions than the TiC.

Peaks of residual TiSi$_2$, TaSi$_2$ and their solid solution [(Ta,Ti)Si$_2$] were detected. The Ta$_5$Si$_3$ and Ti$_5$Si$_3$ phases are not present in the 1800° C. pattern, showing that they were converted into carbides according to the Reactions 4 and 5, or according to the Reactions 6 and 7 routes.

Similarly, the free Si phase showed a complete disappearance at 1800° C. At 1600° C. the Si peak, evident at about 2θ=33°, is very pronounced; it diminished gradually from the 1700° C. to the 1800° C. pattern. As the free Si peaks diminished, the SiC peaks became even more pronounced as the RMI temperature was increased.

The peaks initially clustered at 47°<2θ<50° in the 1600° C. pattern show a gradual fusion as the RMI temperature was increased to 1700° C. and 1800° C. This trend could be attributed to the occurrence of interdiffusion in the TaC, (Ti,Ta)C, SiC and TiC species identified to be constituting the peaks.

At 2θ=30°–31° is an evidently amorphous bump at 1600° C. first, followed by a slightly sharpened peak at 1700° C., and then final disappearance at 1800° C. This suggests slight graphitic ordering in the carbon (peak at 31°) from 1600° C. to 1700° C.

There was a shift of the TaC peaks to the left in both the 1700° C. and 1800° C. XRD patterns. The shift increased with increasing 2θ values. Furthermore, the shift of the TaC peaks to the left increases with temperature from 1700° C. to 1800° C. There was also a pronounced overlapping of TiC and SiC peaks, showing they gave similar reflections in the patterns.

Furthermore, the unit cells (face centred cubic) of these phases at 1700° C. and 1800° C. (shown in Table 3) were comparable: a=4.358 Å for TiC and a=4.352 Å for SiC at 1700° C.; a=4.354 Å for TiC and a=4.351 Å for SiC at 1800° C.

TABLE 3

Lattice parameters of the phases present in the UHTCs prepared at 1600° C., 1700° C. and 1800° C. by SPS. Lattice parameters were determined by Rietveld refinement using TOPAS software.

| Phase | Lattice Parameter, α (Å) | | |
| --- | --- | --- | --- |
| | 1600° C. | 1700° C. | 1800° C. |
| TaC | Not present in pattern | 4.453 ± 0.0073 | 4.454 ± 0.0017 |
| TiC | Not present in pattern | 4.35 ± 0.0031 | 4.354 ± 0.0022 |
| (Ta, Ti)C | 4.3802 ± 0.0096 | 4.3941 ± 0.0067 | 4.3972 ± 0.0015 |
| Beta-SiC | 4.3583 ± 0.0084 | 4.3524 ± 0.0067 | 4.3517 ± 0.0013 |

The TaC lattice parameters in Table 3 show slight increase from 1700° C. to 1800° C. These values are lower than the widely accepted lattice values of a=4.455 for TaC (Kosolapova, 1971), probably owing to the existence of vacant C sites. All TiC lattice parameters shown in Table 3 are larger than the reported value of 4.32861 for the stoichiometric $TiC_x$ (x=1) (Wei et al., 2011). This may be due to the existence of TiC in the form of a continuous solid solution with TaC which has larger unit cell dimensions. Values attained in this work could also suggest the unlikely possibility of substoichiometric forms of $TiC_x$ (x<1).

Figure 14:
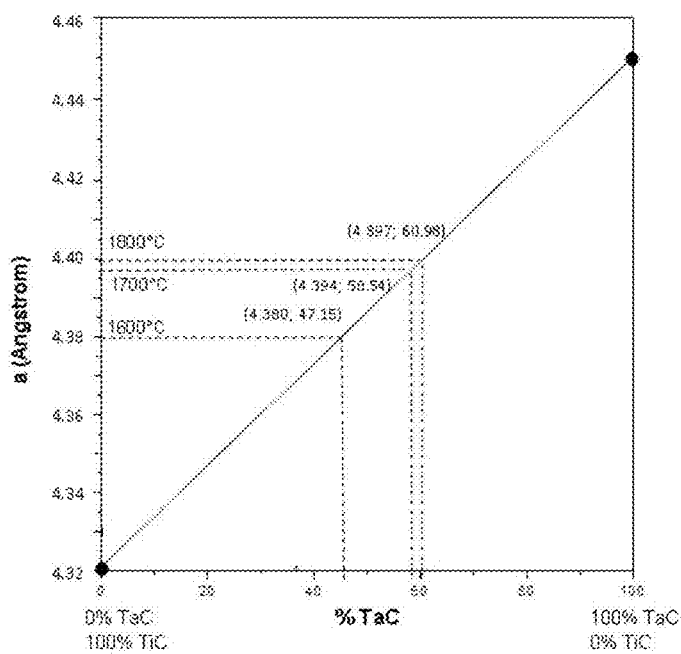
FIG. 14 shows a graphical representation of experimentally determined lattice parameters (after Rietveld refinement) of the (Ti,Ta)C solid solution in the UHTC prepared at 1600° C., 1700° C. and 1800° C., against atomic % tantalum.

The peaks of the (Ta,Ti)C solid solution increased in intensity from 1700° C. to 1800° C. The extent of solid solution between TaC and TiC was determined by interpolating the lattice parameters of the (Ta,Ti)C at a given temperature (1700° C. and 1800° C.) on the straight line graph linking the lattice parameters of the TaC to that of TiC. The estimated compositions of TaC in solid solutions are given in FIG. 14. At 1600° C. the (Ta,Ti)C solid solution consisted of about 47.15 at. % of TaC (52.85 at. % TiC), at 1700° C. the (Ta,Ti)C solid solution consisted of about 58.54 at. % of TaC (41.46 at. % TiC), and at 1800° C. the solid solution consisted of about 60.98 at. % of TaC (39.02 at. % TiC). The TiC:TaC ratios at 1600° C. are very similar to the starting Ti:Ta atomic ratios in the alloy.

Figure 15:
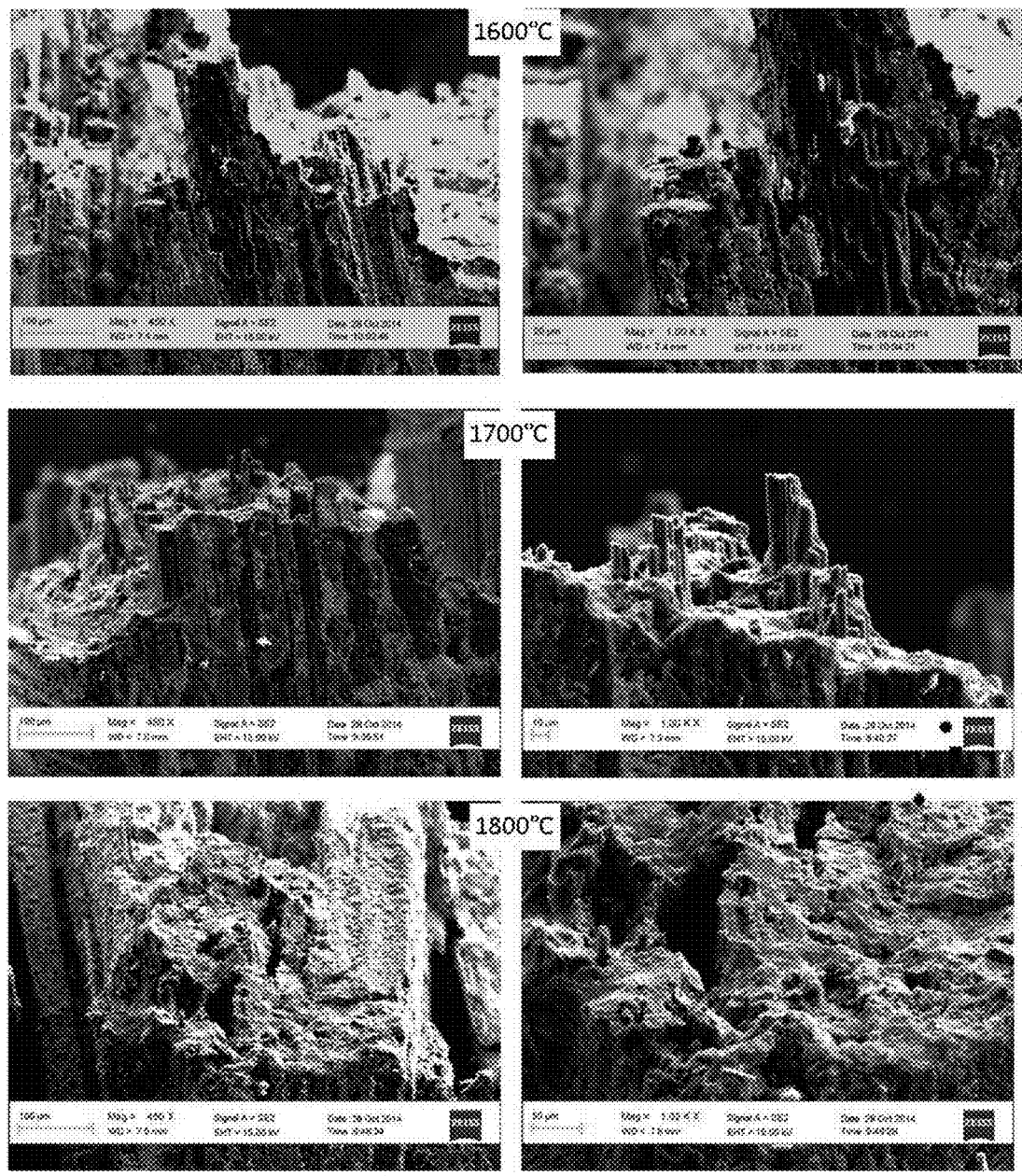
FIG. 15 shows secondary detector SEM micrographs indicating the fracture surfaces of composites comprising $C_f/C$—SiC—TiC—TaC prepared by SPS at 1600° C., 1700° C. and 1800° C. for 30 minutes.

The surface at which the composites fractured revealed the progression of the cracks propagated during fracture, and the way in which the composites absorbed the energy from the load applied. FIG. 15 shows the fracture surfaces of the composites prepared by RMI at 1600° C., 1700° C. and 1800° C.

The 1600° C. composite shows blocks of fibres bound by matrix sticking out. The fibres deflected the fracture cracks in bundle form. It was observed that the clusters of matrix bound to the pulled out fibre bundles or tows suggest that the viscosity of the alloy infiltrated at this temperature was very high, hence the spreading thereof in the $C_f/C$ composite was limited.

The 1700° C. composite shows some fibres which stick out of the rest of the fracture surface, having fractured at different lengths. This suggests that the fibres successfully impeded crack extension across the composite. The fibres deflected the crack along the fibre-matrix interface. The crack consequently followed a discursive path across the composite.

On the contrary, the 1800° C. does not have any pulled out fibres at the fracture surface. It shows a continuous surface fracture surface wherein the sites occupied by fibres are not distinguishable. The micrograph suggests that the alloy infiltrated the composite to saturation and reacted with both the carbon matrix and the carbon fibres. This indicates fused matrix and fibre phases.

Figure 16:
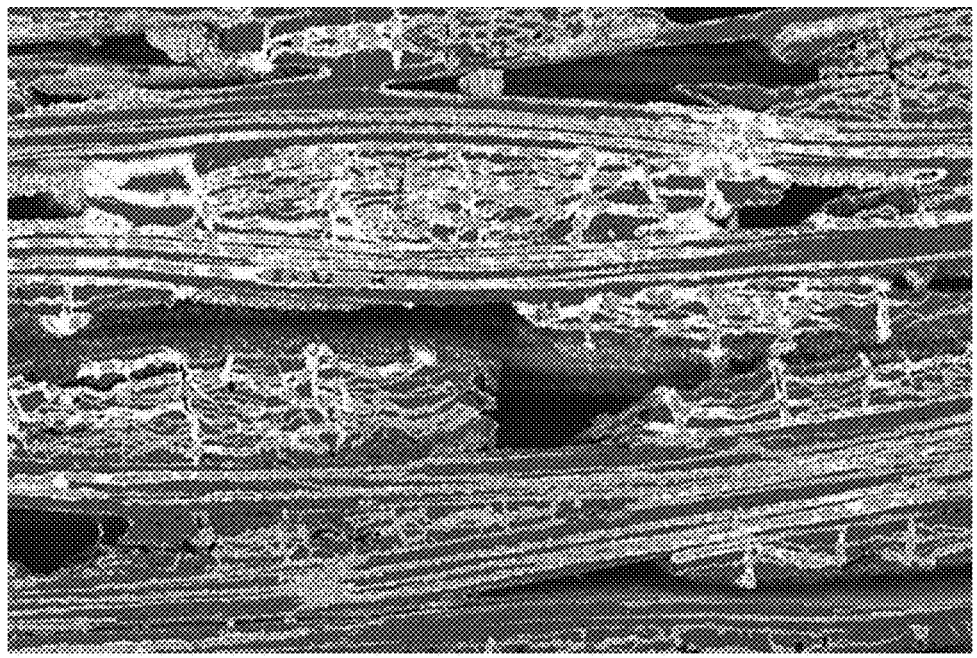
FIG. 16 shows a SEM micrograph (BSE-Detector) of a cross-section of the composites comprising $C_f/C$—SiC—TiC—TaC prepared by SPS at 1700° C. for 30 minutes.

Referring now to FIG. 16, it can be seen that a heterogeneous macrostructure was obtained after the reactive melt infiltration step. A phase-gradient is noticeable across the thickness of the composite. In FIG. 16, the upper region was the end from which the alloy was infiltrated. As can be seen in FIG. 16, the upper half laminates show an abundance of the white phases, predominantly (Ta,Ti)C, while the lower half laminates show an abundance of the grey phases, predominantly SiC.

Figure 17:
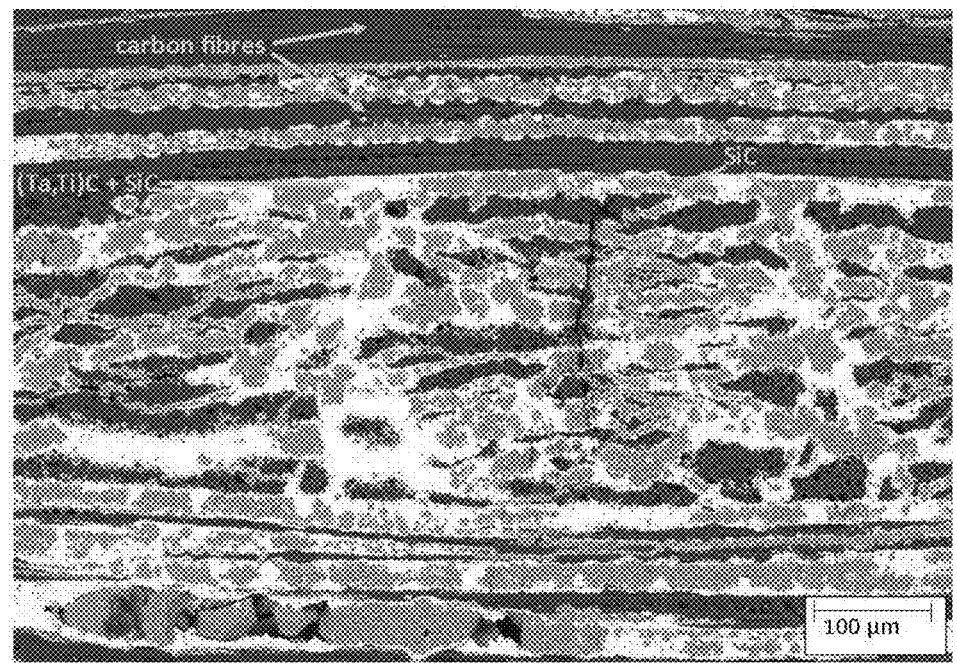
FIG. 17 shows a SEM micrograph (BSE-Detector) showing the microstructure of the longitudinal cross-section of the composites comprising $C_f/C$—SiC—TiC—TaC prepared by SPS at 1700° C. for 30 minutes.
Figure 18:
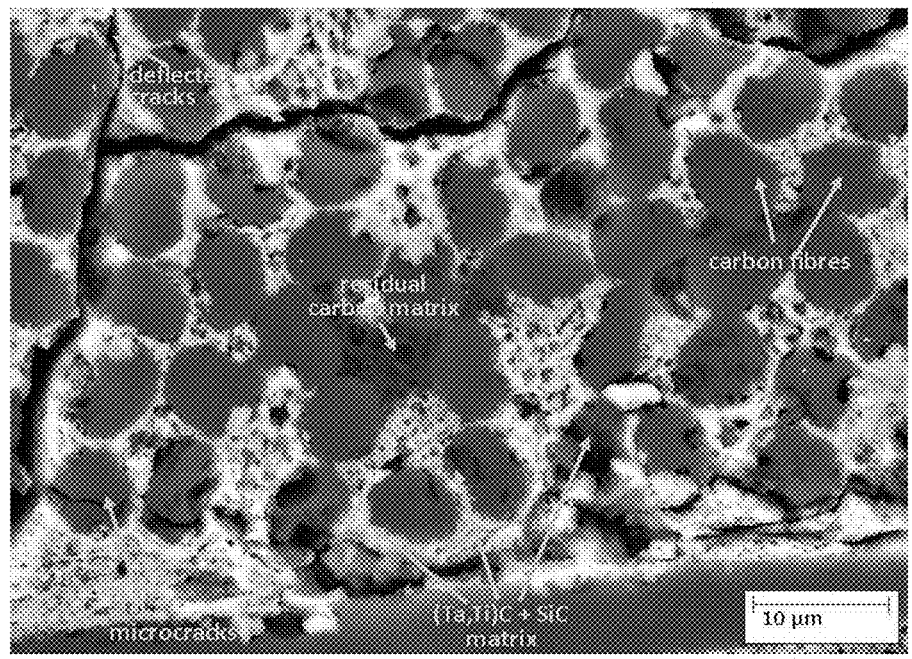
FIG. 18 shows a SEM micrograph (BSE-Detector) showing the microstructure of a transverse cross-section of the composites comprising $C_f/C$—SiC—TiC—TaC prepared by SPS at 1700° C. for 30 minutes.

The microstructure at higher magnifications is shown in FIG. 17 and FIG. 18 respectively. FIG. 17 is a longitudinal elaboration of how the alloy lodged along the fibre tows. FIG. 18 is a transverse elaboration of how the alloy infiltrated through the tows and into the spaces between the individual fibres of the composite.

Figure 19:
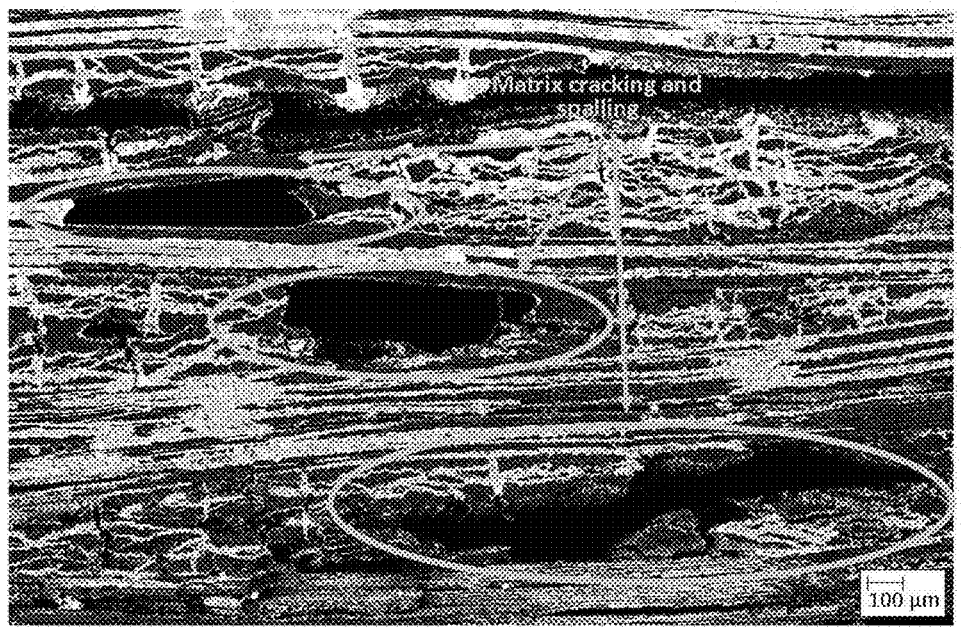
FIG. 19 shows a SEM micrograph (BSE-Detector) of a cross-section of the composites comprising $C_f/C$—SiC—TiC—TaC prepared by SPS at 1700° C. for 30 minutes.

With reference to FIG. 19, the composite also shows voids in the structure of more than 500 µm in length and more than 100 µm in width. FIG. 19 provides an indication of how the matrix cracked, with some matrix blocks even spalling off during ceramographic preparation. These voids have a marked presence at the matrix concentrated regions. The cracking in the matrix can be attributed to the mismatch of the coefficients of thermal expansion in the carbides formed. The cooling rate of 200° C./min could have induced thermal shock as well. It must be borne in mind that this high cooling rate was applied in order to constrain the disproportionation of the carbide phases formed. FIG. 18 show that the cracks which occurred in the matrix deflected the fibres in their formation. This is a reflection of a favourable fibre/matrix interface.

Other transition metals which may be used in the present invention in providing the alloy to be infiltrated into the $C_f/C$ composite include transition metals selected from the group consisting of zirconium, hafnium, vanadium, niobium, chromium, molybdenum, and tungsten. An alloy comprising mixtures of titanium and/or tantalum with metals of the aforementioned list is also foreseen. These transition metals all form similar silicides which easily alloy among themselves, these alloys possessing eutectics lower than the melting temperatures of the pure silicides. Therefore, an infiltration at lower temperature is possible in comparison to pure silicides. All of these transition metal silicides react with carbon and form hard and stable carbides. Most of them (excluding WC) form the same crystal structure of the MC (NaCl structure type) and form therefore extended stable solid solutions. The use of more than two of these transition elements could even reduce the infiltration temperature further without reducing the properties of the resulting composite.

Ablation Resistance Testing

The composite comprising $C_f/C$—SiC—TiC—TaC was tested for its ablation resistance by the oxyacetylene test according to the ASTM E285-80(2002) Standard Test Method for Oxyacetylene Ablation Testing of Thermal Insulation Materials. The set up consisted of a welding torch (Victor, Model 315) with a water cooled nozzle, a graphite sample holder, and a thermocouple in contact with the back of the sample supported by a spring loaded shaft.

The test involved directing an oxyacetylene flame at the $C_f/C$—SiC—TiC—TaC composite. At the aforementioned conditions the flame is known to be at a temperature of at least 3000° C. A timer automatically recorded the time at which the samples were exposed to the flame.

Linear and mass ablation rates, and the change in the densities of the samples were measured for a sample exposure time of 2.1 s to 7.9 s and heat flux of 4 $MW/m^2$.

For comparison purposes, the same oxyacetylene flame test was performed on the $C_f/C$ composite preform discs (20 mm diameter, 3 mm thickness). Ablation rates obtained for the 2.5 s, 5.0 s and 7.5 s runs for both the $C_f/C$ composite and the UHTC were used in the comparisons.

The compounds formed from the burning of the $C_f/C$—SiC—TiC—TaC containing composite and the $C_f/C$ composite were characterised by XRD. Back-scattered electrons detector (BSED) SEM was used to examine the microstructures of the ablated materials; EDS and electron probe micro-analysis (EPMA) were used to quantify the oxides formed. The resultant densities of the ablated $C_f/C$—SiC—TiC—TaC and $C_f/C$ composites were obtained by the Archimedes wet/dry method.

The $C_f/C$ composite exposed to the flame for 2.5 s had no immediately obvious damage on a macro-scale. On the other hand, the disc exposed for 5.0 s showed to have burst open and delaminated on the central region directly exposed to the flame. The disc exposed for 7.5 s showed pitted damage which was radially extensive on the surface of the disc.

The mass and linear ablation rates in Table 4 below were calculated from the ratio of change in mass and thickness, respectively, to time. The mass ablation rate gradually increased with increasing exposure time to the flame. While the linear ablation rate increased with increasing exposure time, the rate more than doubled between 5.0 s and 7.5 s of exposure. This shows the worsened deepening of the crater formed at the surface exposed directly to the flame suggesting worsening mechanical damage of the $C_f/C$ composite with time.

TABLE 4

Mass and linear ablation rates of the $C_f/C$ discs exposed to the oxyacetylene flame for 2.5 seconds, 5.0 seconds, and 7.5 seconds.

| Time of exposure to oxyacetylene flame | Mass Ablation rate | Linear Ablation rate |
|---|---|---|
| 2.5 s | 0.0129 g/s | 0.0870 mm/s |
| 5.0 s | 0.0218 g/s | 0.1176 mm/s |
| 7.5 s | 0.0402 g/s | 0.3773 mm/s |

Figure 25:
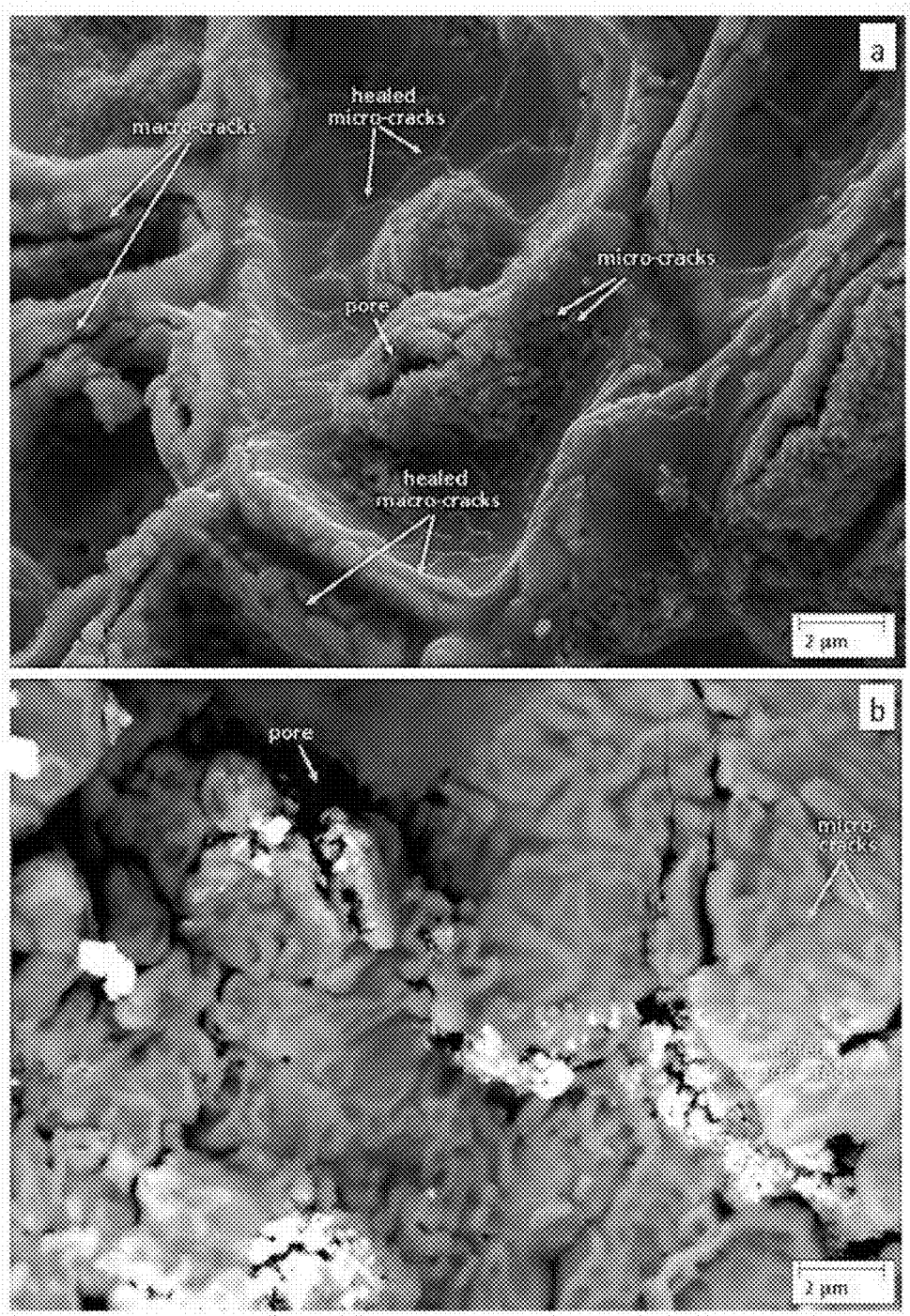
FIG. 25 shows SEM micrographs (BSE-Detector) of (a) the cross-section (Region 3 in FIG. 29), and (b) the upper surface of the UHTC exposed to the oxyacetylene flame for 7.5 seconds.

The microstructures of the ablated $C_f/C$ composites are shown in FIG. 25.

Figure 20:
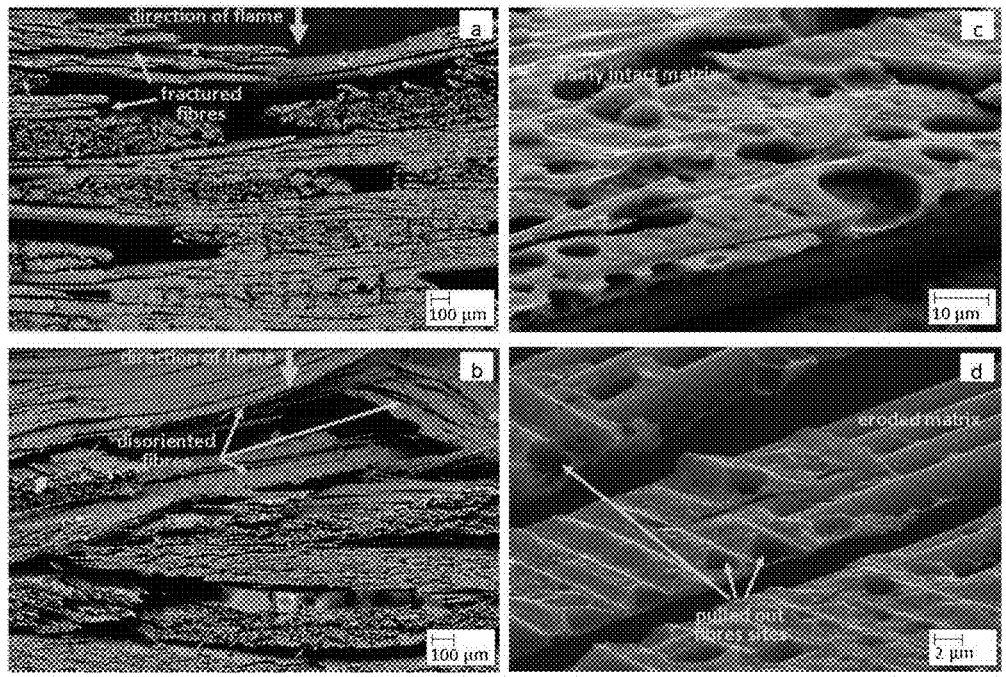
FIG. 20 shows SEM micrographs (BSE-Detector) of the cross-section of the $C_f/C$ composite exposed to the oxyacetylene flame for 2.5 seconds.

The disc exposed for 2.5 s shows upper layer laminates to have been damaged (FIG. 20a). Fibres in these layers were fractured by the impact of the oxyacetylene flame gases on the composite surface. Thereafter delamination of the fractured fibre tows occurred, and the blowing away of the debris followed. This left the matrix of the underlying layer of fibres exposed to the flame (FIG. 20c). Consequential erosion of the matrix occurred (FIG. 20d) at 5.0 s of exposure to the flame, thus exacerbated fibre fracturing and fibre tows disorientation occurred. Some matrix in-between fibre tows remained intact such that the fibres fractured and left the composite in bundle form.

Figure 21:
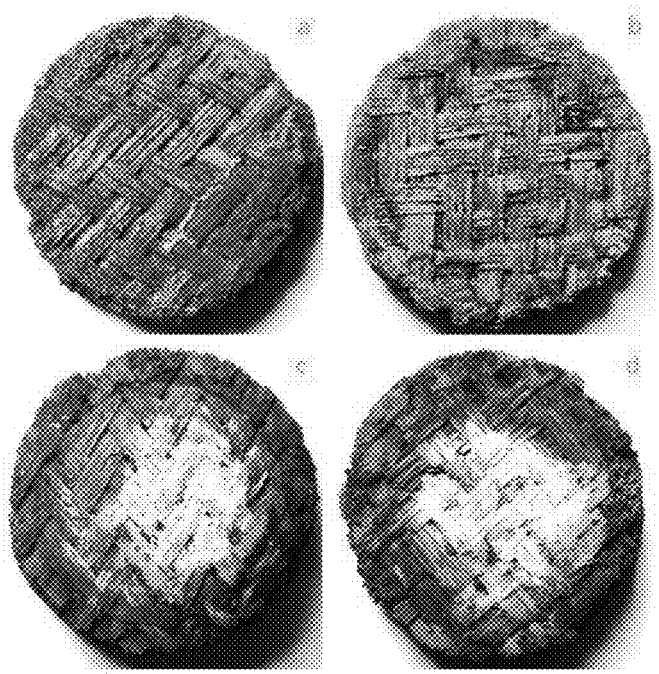
FIG. 21 shows photographs of UHTC discs of 20 mm diameter: (a) unexposed to flame, (b) 2.5 s flame exposure time, (c) 5.0 s flame exposure time, and (d) 7.5 s flame exposure time.

FIG. 21 shows photographs of the virgin $C_f/C$—SiC—TiC—TaC containing composite (before ablation) and the discs that were exposed to the oxyacetylene flame for different durations: 2.5 s; 5.0 s, and 7.5 s. The mass and linear ablation rates shown in Table 5 below were calculated from the ratio of change in mass and thickness, respectively, to time.

TABLE 5

Mass and linear ablation rates of the UHTC discs exposed to the oxyacetylene flame for 2.5 seconds, 5.0 seconds, and 7.5 seconds.

| Time of exposure to oxyacetylene flame | Mass Ablation rate | Linear Ablation rate |
|---|---|---|
| 2.5 s | 0.00327 g/s | 0.00224 mm/s |
| 5.0 s | 0.00342 g/s | 0.00208 mm/s |
| 7.5 s | 0.00388 g/s | 0.00216 mm/s |

Figure 22:
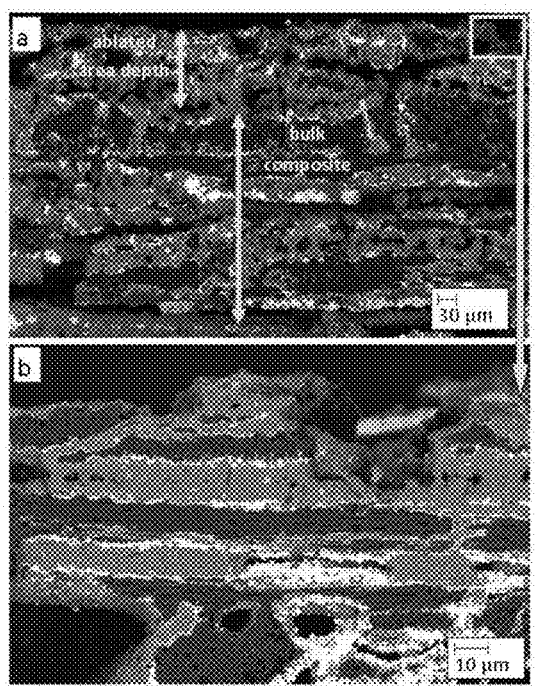
FIG. 22 shows SEM micrographs (BSE-Detector) of the cross-section of the UHTC exposed to the oxyacetylene flame for 2.5 seconds.

2.5 s exposure time: the composite (FIG. 21b) does not show any scale formation after exposure to the flame. The composite, however, shows aggravated cracking and physical degradation on the upper most layer (80-100 μm) thickness) in FIG. 22. This layer shows that pitting erosion and ablation to have occurred. The ablated sample also shows some char rings on the peripheries of the discs, similar to those appearing on the sample holder. This ring was defined by the flame boundaries on the $C_f/C$—SiC—TiC—TaC sample.

Figure 23:
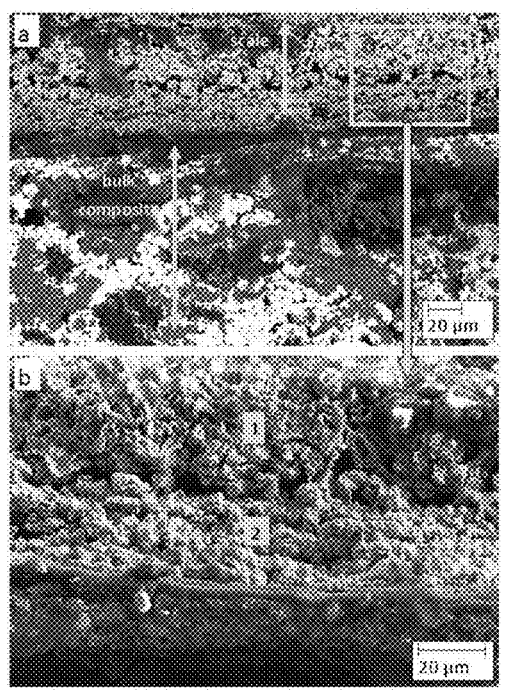
FIG. 23 shows SEM micrographs (BSE-Detector) of the cross-section of the UHTC exposed to the oxyacetylene flame for 5.0 seconds.

5.0 s exposure time: The ablated disc (FIG. 21c) shows some white scale on the central area which was exposed to the oxyacetylene flame. The scale formed showed two rather distinct micro-structured layers. Layer 1 has crumpled popcorn-like scale morphology. There exist some huge pores along the interface line between layer 1 and 2 which allow the ingress of oxygen other than the paths located at the top of the composite. The morphologies shown in FIG. 23 resemble that of popped kernels of corn. In FIG. 23b, layer 2 showed suppressed or limited 'popping' versus layer 1 in which significant 'popping' of the composite material occurred.

Figure 24:
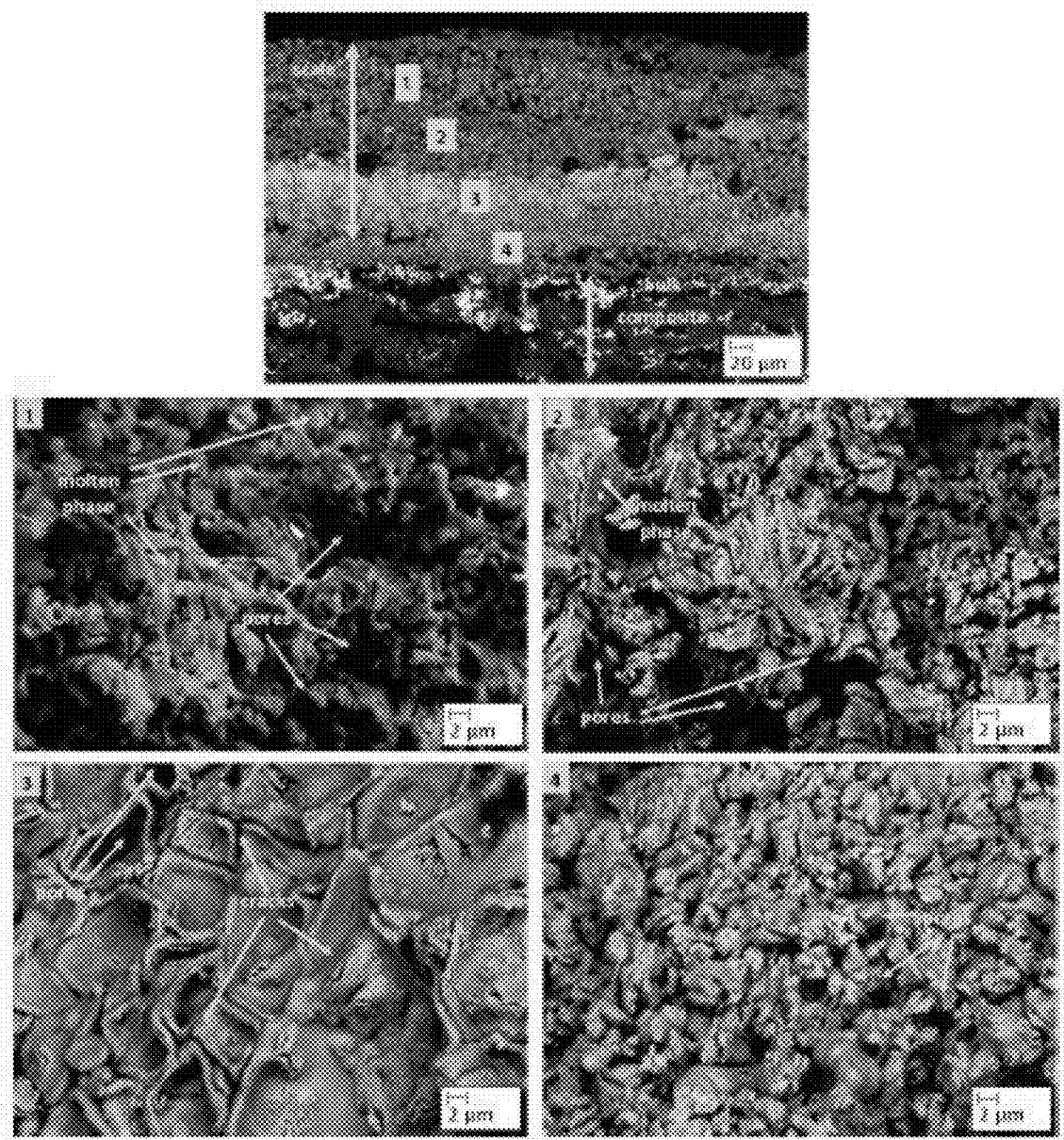
FIG. 24 shows SEM micrographs (BSE-Detector) of the cross-section of the UHTC exposed to the oxyacetylene flame for 7.5 seconds. 1-4 are micrographs of the individual layers of the scale which formed on the UHTC.

7.5 s exposure time: the SEM micrograph in FIG. 24 shows a layer of the ablation products of thickness about 120 μm. This layer showed four distinctly stratified bands, with distinct morphologies and chemical composition profiles. Layer 1 is the top band which has crumple morphology, similar to layer 1 in FIG. 24b. The ablation products show a loose texture, also comprising of sparse black blotches in the layer. Layers 4, 2 and 1 in FIG. 24 show limited, moderate, and significant 'popping' respectively. Layer 3 clearly shows a dense layer with a distinct lustre and texture.

This layer (3) presents the evidence of the self-healing concept. As can be seen in FIG. 25, there exist macro-cracks and micro-cracks.

In the micro-cracks, there is seen a molten liquid which intruded into the formed micro-cracks and closed up the openings. The inception of macro-cracking also prompted the sealing of the fissures by way of a stitched-up fashion. The microstructure could be envisaged to be the result of the release of oxidation product gases which overcome the sealing effect of the glass formed in the matrix and the composite progresses to the morphology shown in Layer 2.

The ash profile microstructures suggest that the oxidation of the composite occurs in gradient profile which advances into the bulk of the composite. Without thereby wishing to be bound by any particular theory, it is believed that the development of the said microstructures can be explained as follows: the volatile gases formed expand within the composite structure and when beyond the critical vapour pressure of equilibrium the gases break out rupturing the composite and leaving behind some pores. As the release of gases intensifies, so does the rupturing in the composite. Spongy flakes burst outwards from the inside in a popping fashion—hence the parallel to the manner in which popcorn pops and the resultant morphology.

The bursting apart of the composite exposes the inside of the composite to oxygen, hence exacerbating the oxidation reactions in the composite. This also advances the sites of oxidation and this is how the scale profile extends into the bulk of the composite.

Figure 26:
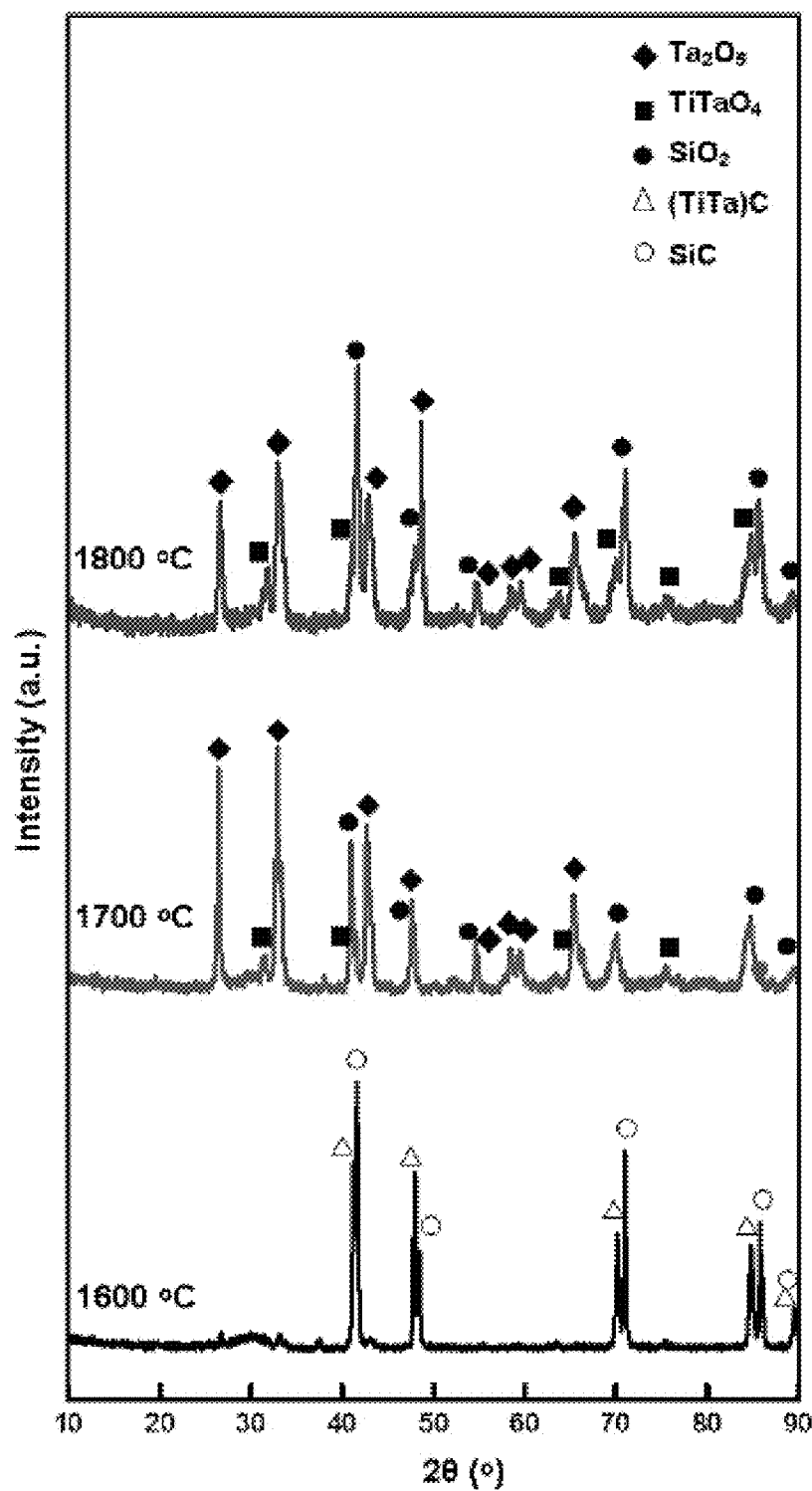
FIG. 26 shows XRD pattern of the surface of the UHTC spark plasma sintered at 1700° C. and exposed to the oxyacetylene flame for 2.5 s, 5.0 s and 7.5 s.

The XRD pattern in FIG. 26 shows a pattern similar to that of the 1700° C. UHTC whereby the major peak occurring at 2θ=42° is that of SiC and is overlapped by the peaks of the (Ti,Ta)C, TiC and TaC phases. While the UHTC generally resisted oxidation over 2.5 seconds, a closer look at the XRD pattern in FIG. 31 shows that there are some very small peaks occurring at 2θ=27°, 32.5°, 33.5°, and 43° which represent $Ta_2O_5$. The quantities of these oxides could be very minute but they give an indication that oxidation was beginning in the composite.

At 5.0 seconds, the transition metal carbides oxidised to form $Ta_2O_5$ and $TiTaO_4$. The peaks overlapped at several positions as shown in FIG. 26. However, the original carbides also persisted in the ceramic mixture suggesting that not all the carbide phases were converted to oxides, a phenomenon attributed to short time exposure. After 7.5 seconds the whole range of carbides in the UHTC formed oxides, including $SiO_2$—all the SiC phase was oxidised to $SiO_2$.

The physical integrity of the composite is compromised by the exposure of the UHTC to excessively high temperatures before thermochemical decomposition occurs.

Thermochemical decomposition occurs predominantly by oxidation. Carbon oxidises to form gaseous CO and $CO_2$ as the temperatures at which the inner core of the flame will be at around 3000° C.-3300° C. The release of these gases from the UHTC introduces porosity as seen in the upper layer of the scale in the UHTC exposed for 7.5 s.

$$SiC + 2O_2(g) \rightarrow SiO_2 + CO_2(g) \quad (9)$$

$$C(s) + O_2(g) \rightarrow 2CO(g) \quad (10)$$

$$CO(g) + O_2(g) \rightarrow 2CO_2(g) \quad (11)$$

Ablation for 5.0 s: The reactions must have occurred according to the Reactions 41 and 42:

$$4TaC(s) + 7O_2(g) \rightarrow 2Ta_2O_5(s) + 4CO(g) \quad (12)$$

$$2TiC(s) + 3O_2(g) \rightarrow 2TiO_2(s) + 2CO(g) \quad (13)$$

Ablation for 7.5 s: The XRD pattern suggests that reactions must have occurred according to the Reaction 14:

$$(TaTi)C_2(s) + 3O_2(g) \rightarrow TaTiO_4(s) + CO(g) \quad (14)$$

The XRD results show that the TaC was oxidised the most compared to the TiC and SiC in the composite. Both TaO and $Ta_2O_5$ were positively identified in the XRD analysis.

In summary, a $C_f/C$ composite preform of density 1.54 g/cm³ and open porosity 21% was prepared by 3 cycles of polymer infiltration and pyrolysis using phenolic resin. An amorphous carbon matrix resulted.

The Si—X—Y alloy was prepared by arc melting from $TaSi_2$ and $TiSi_2$ powders formed tantalum titanium silicides solid solutions [$(Ta,Ti)Si_2$ and $(Ta,Ti)_5Si_3$].

When the alloy was infiltrated into the $C_f/C$ composite preform at 1700° C. by SPS for 30 minutes, carbides of Ta, Ti and Si and the (Ta,Ti)C solid solution were obtained. At an infiltration temperature of 1600° C. the phase composition of the resulting composite was dominated by unreacted silicides. SiC is the only carbide which was convincingly formed, although (Ta,Ti)C was observed to have incipiently precipitated at the C/alloy interface.

At an infiltration temperature of 1800° C. the carbide formation reactions extended to the reinforcing fibres, thus compromising the fibres' reliability.

Upon exposure to an oxyacetylene flame at about 3000° C., the ceramic composite comprising $C_f/C$—TaC—TiC—SiC showed thermomechanical degradation first, and thermochemical degradation thereafter. After 7.5 s of exposure to the oxyacetylene flame, the UHTC showed a low mass ablation rate of 0.00388 g/s and no linear ablation rate owing to the scale of the oxides formed adhering to the surface of the composite. The scale showed that the composite constituents had the ability to form glassy self-healing compounds based on $SiO_2$.

The $C_f/C$—SiC—TiC—TaC matrix, when in service, cracks due to thermal expansion mismatches of the carbides contained therein. Glassy phases of $SiO_2$, and possibly $TiO_4$—$SiO_2$ and $Ta_2O_5$—$SiO_2$ are formed during oxidation reactions; they intrude and fill-up the cracks, thereby providing a self-healing mechanism for healing the composite.

The above description of some of the illustrative embodiments of the invention is to indicate how the invention can be made and carried out. Those of ordinary skill in the art will know that various details may be modified thereby arriving at further embodiments, but that many of these embodiments will remain within the scope of the invention. For example, it will be appreciated that various modifications to the $C_f/C$ composite, and the composition of the alloy to be infiltrated into the composite, could be made based on a reliance of this disclosure contained herein without an undue experimental burden.

The invention claimed is:

1. A carbide ceramic matrix composite comprising:
   a carbon fibre reinforced carbon matrix;
   silicon carbide; and
   two or more transition metal carbides, wherein the two or more transition metal carbides include transition metals selected from the group consisting of titanium, zirconium, hafnium, vanadium, niobium, tantalum, chromium, molybdenum, and tungsten.

2. The carbide ceramic matrix composite of claim 1, wherein the two or more transition metal carbides are two transition metal carbides including two transition metals selected from the group consisting of titanium, zirconium, hafnium, tantalum, molybdenum, and tungsten.

3. The carbide ceramic matrix composite of claim 2, wherein the two transition metal carbides are titanium carbide and tantalum carbide.

4. The carbide ceramic matrix composite of claim 2, wherein an alloy of silicon and the two transition metals of the two transition metal carbides is a non-eutectic composition having a ratio of about 17.9 Ti-15.4 Ta-66.7 Si.

5. The carbide ceramic matrix composite of claim 1, wherein an alloy comprising two or more transition metal silicides is infiltrated into the carbon fibre reinforced carbon matrix, and wherein the alloy is a non-eutectic composition, and wherein the two or more transition metal silicides include transition metals selected from the group consisting of titanium, zirconium, hafnium, vanadium, niobium, tantalum, chromium, molybdenum, and tungsten.

6. The carbide ceramic matrix composite of claim 5, wherein the carbon fibre reinforced carbon matrix has a porosity prior to infiltration of about 20 to about 30% by volume.

* * * * *